United States Patent
Lee et al.

(10) Patent No.: US 11,161,777 B2
(45) Date of Patent: Nov. 2, 2021

(54) GLASS SUBSTRATE AND METHOD FOR MANUFACTURING THE SAME

(71) Applicant: SAMSUNG DISPLAY CO., LTD., Yongin-Si (KR)

(72) Inventors: Hoikwan Lee, Suwon-si (KR); Gyuin Shim, Yongin-si (KR); Seungho Kim, Asan-si (KR); Jeongseok Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 86 days.

(21) Appl. No.: 16/558,873

(22) Filed: Sep. 3, 2019

(65) Prior Publication Data
US 2020/0071225 A1 Mar. 5, 2020

(30) Foreign Application Priority Data
Sep. 3, 2018 (KR) .................. 10-2018-0104510

(51) Int. Cl.
*C03C 14/00* (2006.01)
*C03C 3/04* (2006.01)
(Continued)

(52) U.S. Cl.
CPC .............. *C03C 14/006* (2013.01); *C03C 3/04* (2013.01); *C03C 4/0092* (2013.01); *C03C 23/007* (2013.01); *C03C 2201/50* (2013.01)

(58) Field of Classification Search
CPC ....... C03C 14/006; C03C 3/04; C03C 4/0092; C03C 23/007; C03C 2201/50; C03C 21/002; C03C 10/0027; C03B 27/03
See application file for complete search history.

(56) References Cited

U.S. PATENT DOCUMENTS 2,779,136 A 1/1957 Hood et al.
3,907,577 A 9/1975 Kiefer et al.
(Continued)

FOREIGN PATENT DOCUMENTS

KR 10-0915286 9/2009
KR 10-1593493 2/2016
(Continued)

OTHER PUBLICATIONS

Zhaoxia Hou, et al., "Study on Crystallization and Microstructure of Li2O—Al2O3—SiO2 Glass Ceramics", Journal of University of Science and Technology Beijing, vol. 13, No. 6, Dec. 2006, pp. 564-569.
(Continued)

*Primary Examiner* — Noah S Wiese
(74) *Attorney, Agent, or Firm* — F. Chau & Associates, LLC

(57) ABSTRACT

A glass substrate and a method for manufacturing the glass substrate are provided. The glass substrate may include a base glass including $SiO_2$, $Al_2O_3$, and $Li_2O$, and nanocrystals having an average diameter in a range from about 5 nm to about 10 nm, thereby exhibiting enhanced surface strength properties while maintaining good transmittance properties. The method may include a step of heat-treating a base glass, thereby providing a glass substrate having enhanced strength properties.

22 Claims, 13 Drawing Sheets

(51) Int. Cl.
*C03C 4/00* (2006.01)
*C03C 23/00* (2006.01)

(56) References Cited

U.S. PATENT DOCUMENTS

| | | | | |
|---|---|---|---|---|
| 7,589,038 | B2* | 9/2009 | Goto | C03C 10/0027 428/846.9 |
| 9,416,048 | B2 | 8/2016 | Sawai | |
| 2007/0082294 | A1 | 4/2007 | Goto et al. | |
| 2008/0268295 | A1* | 10/2008 | Yagi | C03C 3/083 428/846.9 |
| 2013/0011695 | A1* | 1/2013 | Yagi | G11B 5/7315 428/846.9 |
| 2014/0134397 | A1* | 5/2014 | Amin | C03C 10/0036 428/141 |
| 2015/0064474 | A1* | 3/2015 | Dejneka | C03C 3/097 428/410 |
| 2016/0031739 | A1 | 2/2016 | Lezzi et al. | |
| 2016/0102010 | A1* | 4/2016 | Beall | C03C 21/002 428/410 |
| 2016/0257608 | A1* | 9/2016 | Harryson | C03C 10/00 |
| 2017/0197384 | A1* | 7/2017 | Finkeldey | B32B 17/10036 |
| 2018/0105454 | A1 | 4/2018 | Zheng et al. | |
| 2018/0186686 | A1 | 7/2018 | Beall et al. | |

FOREIGN PATENT DOCUMENTS

| | | |
|---|---|---|
| KR | 10-1770560 | 8/2017 |
| KR | 10-2018-0033583 | 4/2018 |

OTHER PUBLICATIONS

Extended European Search Report dated Jan. 27, 2020 in corresponding European Patent Application No. 19195009.6 (11 pages).

* cited by examiner

GLASS SUBSTRATE AND METHOD FOR MANUFACTURING THE SAME

CROSS-REFERENCE TO RELATED APPLICATIONS

This U.S. non-provisional patent application claims priority under 35 U.S.C. § 119 to Korean Patent Application No. 10-2018-0104510, filed on Sep. 3, 2018, the entire contents of which are herein incorporated by reference.

TECHNICAL FIELD

The present inventive concept relates to a glass substrate and a method for manufacturing the glass substrate, and more particularly, to a glass substrate including nanocrystals and a method for manufacturing the glass substrate including forming the nanocrystal s.

DISCUSSION OF RELATED ART

A glass substrate is variously applied to electronic devices such as, for example, liquid crystal displays (LCD), plasma display panels (PDP), and organic light emitting diode displays (OLED). Within the various applications to the electronic devices, the glass substrate may be used as a substrate of a display panel which is used in manufacturing a television, a computer monitor, a potable terminal, or the like, or as a cover glass for protecting the display panel.

Recently, due to the trend toward slimmer electronic devices, the glass substrate being lighter and thinner is desirable. In addition, a processing method, a toughening method or the like capable of enhancing the strength of the thin glass substrate is being researched.

SUMMARY

The present inventive concept provides a glass substrate with enhanced durability against impact.

The present inventive concept also provides a method for manufacturing a glass substrate that can form nano-sized crystals inside the glass substrate to thus enhance the durability of the glass substrate.

An exemplary embodiment of the present inventive concept provides a glass substrate including: a base glass including $SiO_2$, $Al_2O_3$, and $Li_2O$; and nanocrystals included in the base glass, and having an average diameter in a range from about 5 nm to about 10 nm.

In an exemplary embodiment of the present inventive concept, the nanocrystals may be crystal particles each including Li.

In an exemplary embodiment of the present inventive concept, the nanocrystals each may include at least one of $Li_2Si_2O_5$, $Li_2SiO_3$, $LiAlSi_2O_6$, or $LiAlSi_3O_3$.

In an exemplary embodiment of the present inventive concept, the nanocrystals are disposed adjacent to at least one of an upper surface or a lower surface of the base glass.

In an exemplary embodiment of the present inventive concept, the glass substrate may include a compressive stress layer formed adjacent to a surface of the base glass.

In an exemplary embodiment of the present inventive concept, a depth of the compressive stress layer may not be smaller than a depth of a crystal layer, wherein the depth of the crystal layer may be a maximum depth from the surface of the base glass to a point at which the nanocrystal is disposed.

In an exemplary embodiment of the present inventive concept, the nanocrystals may be included in the compressive stress layer.

In an exemplary embodiment of the present inventive concept, crystal layers in which the nanocrystals are disposed may each be disposed adjacent to each of an upper surface and a lower surface of the base glass, in which a depth of each of the crystal layers may be about 10% or less of total thickness of the base glass.

In an exemplary embodiment of the present inventive concept, the base glass may include a flat portion and at least one bending portion adjacent to the flat portion.

In an exemplary embodiment of the present inventive concept, the glass substrate may have a transmittance of about 85% or more in wavelength region of visible light.

An exemplary embodiment of the present inventive concept provides a glass substrate including: a compressive stress layer formed adjacent to a surface thereof; and nanocrystals distributed in the compressive stress layer and having an average diameter in a range from about 5 nm to about 10 nm.

In an exemplary embodiment of the present inventive concept, the nanocrystals may be disposed adjacent to an upper surface and a lower surface.

In an exemplary embodiment of the present inventive concept, the nanocrystals each may include at least one of $Li_2Si_2O_5$, $Li_2SiO_3$, $LiAlSi_2O_6$, or $LiAlSi_3O_3$.

An exemplary embodiment of the present inventive concept provides a method for manufacturing a glass substrate, the method including: providing a base glass including $SiO_2$, $Al_2O_3$, and $Li_2O$; and heat-treating the base glass at a first temperature, in which the first temperature is in a range from $(Tg+50)°$ C. to $(Ts+150)°$ C., in which the Tg is a glass transition temperature of the base glass, and the Ts is a softening point temperature of the base glass.

In an exemplary embodiment of the present inventive concept, the heat-treating of the base glass may include forming nanocrystals in the base glass each including Li, and the nanocrystals may have an average diameter in a range from about 5 nm to about 10 nm.

In an exemplary embodiment of the present inventive concept, the nanocrystals may be formed adjacent to at least one of an upper surface or a lower surface of the base glass.

In an exemplary embodiment of the present inventive concept, the method for manufacturing a glass substrate may further include toughening the base glass.

In an exemplary embodiment of the present inventive concept, the toughening of the base glass may be performed by providing a toughening molten salt to the heat-treated base glass and chemically toughening the base glass at a second temperature.

In an exemplary embodiment of the present inventive concept, the second temperature may be equal to or lower than the first temperature.

In an exemplary embodiment of the present inventive concept, the toughening molten salt may be a single salt including any one ion of $Na^+$, $K^+$, $Rb^+$ and $Cs^+$, or a mixed salt including at least two or more ions of $Li^+$, $Na^+$, $K^+$, $Rb^+$ and $Cs^+$.

In an exemplary embodiment of the present inventive concept, the chemically toughening may include: a first toughening step of performing ion-exchange treatment at a first toughening temperature; and a second toughening step of performing ion-exchange treatment at a second toughening temperature, which is equal to or lower than the first toughening temperature.

In an exemplary embodiment of the present inventive concept, the Tg may be in a range from about 400° C. to about 700° C., and the Ts may be in a range from about 500° C. to about 750° C.

In an exemplary embodiment of the present inventive concept, the heat-treating of the base glass may be performed by disposing heat-resistant glass substrates on both sides with the base glass in-between and heat-treating the base glass.

In an exemplary embodiment of the present inventive concept, the providing of the base glass may include: mixing ceramic powder and glass powder to form a mixed molten solution; and molding the mixed molten solution into a plate shape.

In an exemplary embodiment of the present inventive concept, the ceramic powder may be nanocrystals each including Li.

An exemplary embodiment of the present inventive concept provides a glass substrate for an electronic device including: a base glass; and nanocrystals formed in the base glass to form crystal layers adjacent to an upper surface and a lower surface of the base glass, with a depth of each of the crystal layers being about 10% or less of total thickness of the base glass, in which each of the nanocrystals is a crystal particle including Li, the base glass including the crystal layers serves as the glass substrate for the electronic device and includes a flat portion and at least one bending portion adjacent to the flat portion, and the electronic device includes: a housing defining rear surface of the electronic device; the glass substrate combining the housing to form a case or an enclosure; and a display panel disposed between the glass substrate and the housing in the case or the enclosure, and being capable of at least one of generating images, sensing touch, and sensing light.

In an exemplary embodiment of the present inventive concept, the nanocrystals each includes at least one of $Li_2Si_2O_5$, $Li_2SiO_3$, $LiAlSi_2O_6$, $LiAlSiO_4$, $LiAlSi_3O_8$, $LiAlSi_4O_{10}$ or $LiAlSi_3O_3$.

BRIEF DESCRIPTION OF THE DRAWINGS

The accompanying drawings are included to provide a further understanding of the present inventive concept, and are incorporated in and constitute a part of this application. The drawings illustrate exemplary embodiments of the present inventive concept and, together with the description, serve to explain principles of the present inventive concept. In the drawings.

Figure 1A:
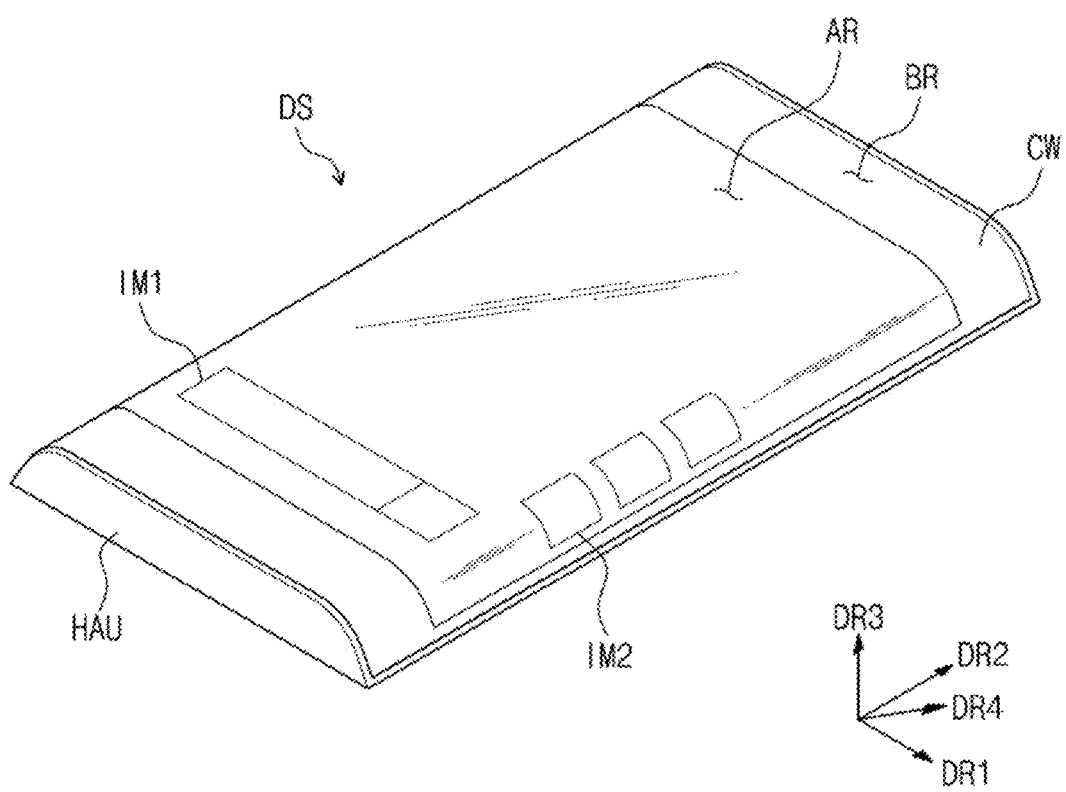
FIG. 1A is a perspective view of an electronic device according to an exemplary embodiment of the present inventive concept.

Since the drawings in FIGS. 1A-15B are intended for illustrative purposes, the elements in the drawings are not necessarily drawn to scale. For example, some of the elements may be enlarged or exaggerated for clarity purpose.

DETAILED DESCRIPTION OF THE EMBODIMENTS

The present inventive concept may be modified in many different forms, and thus specific embodiments will be exemplified in the drawings and described in detail. It should be understood, however, that it is not intended to limit the present inventive concept to the particular form disclosed, but rather to cover various modifications and equivalent arrangements included within the spirit and scope of the present inventive concept.

In the present specification, when it is mentioned that any element (or region, layer, portion, etc.) is "on", "connected to", or "coupled to" another element, it can be directly on, connected or coupled to another component or a third component can be arranged therebetween.

Like reference numerals refer to like elements, and thus their redundant description will be omitted.

The term "and/or" includes any and all combinations of one or more of which the associated configurations may define.

The terms "first", "second", etc. may be used to describe various elements, but the elements should not be limited by the terms. The terms are used only for the purpose of distinguishing one component from another. For example, without departing from the scope of the present inventive concept, the first component may be referred to as a second component, and similarly, the second component may also be referred to as a first component. The singular forms "a", "an" and "the" are intended to include the plural forms as well, unless the context clearly dictates otherwise.

Furthermore, terms such as "under", "the lower side", "above", "the upper side" and the like are used to describe the relationship of the configurations shown in the drawings. The terms are described relative to the direction shown in the figure, in a relative concept. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which the present inventive concept belongs. It is also to be understood that terms, such as those defined in commonly used dictionaries, should be interpreted as having meanings consistent with their meanings in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, components and/or groups, but do not preclude the presence or addition of one or more other features, integers, steps, operations, elements, components, and/or groups thereof.

When the term "about" is used in this specification in connection with a numerical value, it is intended that the associated numerical value includes a tolerance of up to ±10% around the stated numerical value.

Hereinafter, exemplary embodiments of the present inventive concept will be described with reference to the drawings.

Figure 1B:
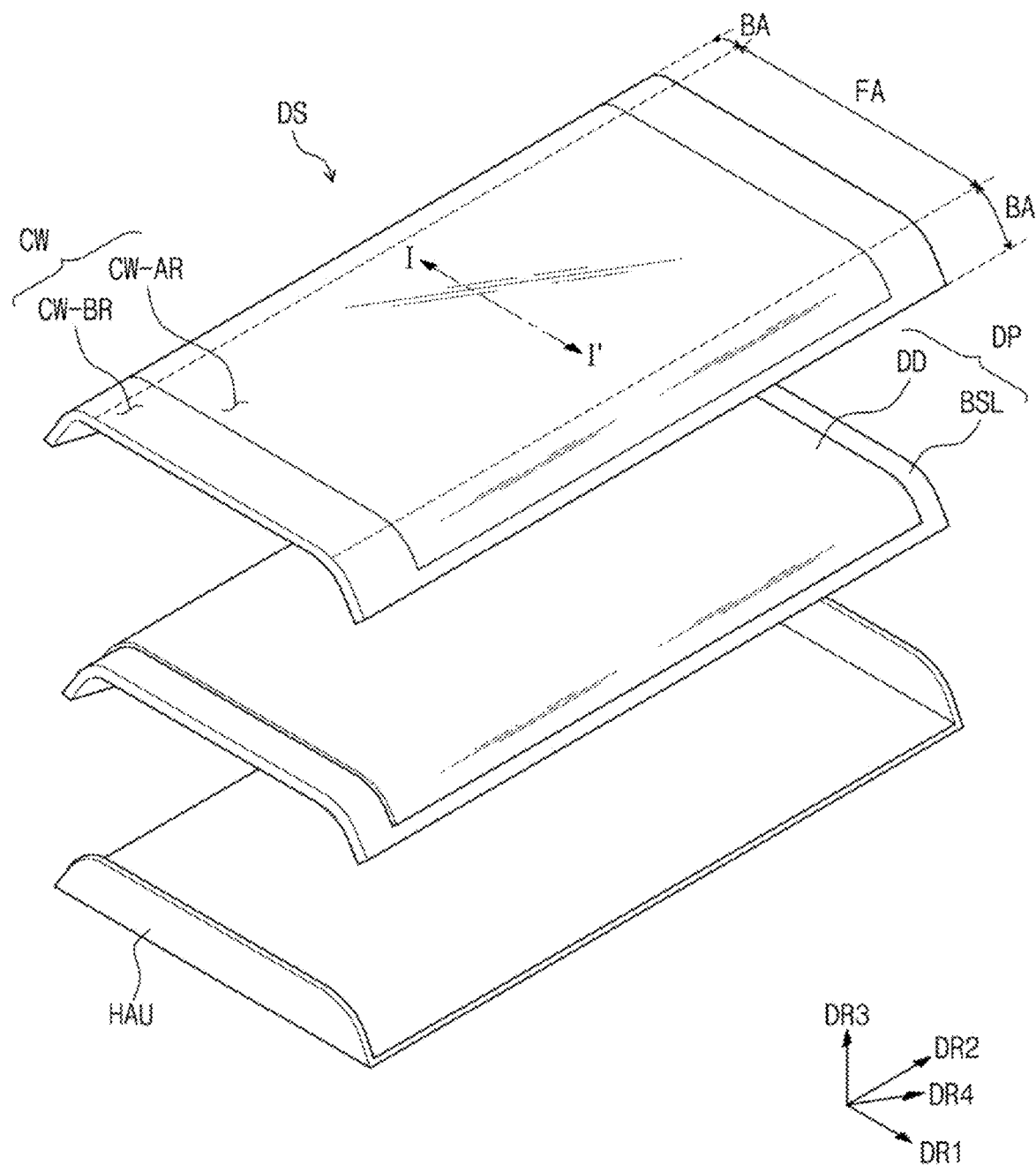
FIG. 1B is an exploded perspective view of the electronic device illustrated in FIG. 1A.

FIG. 1A is a perspective view of an electronic device according to an exemplary embodiment of the present inventive concept. FIG. 1B is an exploded perspective view of the electronic device illustrated in FIG. 1A.

Referring to FIG. 1A, the electronic device DS according to an exemplary embodiment of the present inventive concept may be divided into an active region AR and a peripheral region BR on the plane defined by a first direction DR1 and a second direction DR2. Further, the electronic device DS may have a three-dimensional shape having a predetermined thickness in a third direction DR3, which is a direction perpendicular to the plane defined by the first direction DR1 and the second direction DR2. Meanwhile, in the electronic device DS according to an exemplary embodiment of the present inventive concept illustrated in FIG. 1A, the active region AR and the peripheral region BR may include a bending region having a curved shape. However, the present inventive concept is not limited thereto. For example, unlike the electronic device DS according to an exemplary embodiment of the present inventive concept illustrated in FIGS. 1A and 1B, the electronic device DS according to an exemplary embodiment of the present inventive concept may not include the bending region, or may have a bending region disposed in only one side of the active region AR and the peripheral region BR, or when viewed from the top, include a bending region in three sides or all four sides of the electronic device DS.

The active region AR may be a region activated in response to an electrical signal applied to the electronic device DS. For example, in an exemplary embodiment of the present inventive concept, the electronic device DS may be a display device. Accordingly, the active region AR may be activated to display images IM1 and IM2. First image IM1 may be displayed on the plane defined by the first direction DR1 and the second direction DR2 and provided in the third direction DR3. Second image IM2 may be provided in a fourth direction DR4 having a slope with respect to the plane defined by the second direction DR2 and the third direction DR3. The fourth direction DR4 is illustrative, and the second image IM2 may be provided on the entire bending region. That is, the present inventive concept is not limited to the configuration illustrated in FIG. 1A or FIG. 1B, and the electronic device DS according to an exemplary embodiment of the present inventive concept may display an image in various directions through the curved active region AR provided in the bending region. For example, the second image IM2 may be curved.

FIGS. 1A and 1B are exemplarily illustrated to have the active region AR including the plane region defined by the first direction DR1 and the second direction DR2 and two bending regions in two sides of the electronic device, and the active region AR may be a region which is activated and senses an external touch, or may be a region which senses external light. However, the present inventive concept is not limited thereto. For example, the electronic device DS according to an exemplary embodiment of the present inventive concept may activate the active region AR in various regions depending on the components included in the electronic device DS.

The peripheral region BR is adjacent to the active region AR. Referring to FIG. 1A, in an exemplary embodiment of the present inventive concept, the peripheral region BR may have a shape surrounding the edge of the active region AR. However, this is exemplarily illustrated, and the peripheral region BR may be adjacent to only a part of the edges of the active region AR. Alternatively, in the electronic device DS according to an exemplary embodiment of the present inventive concept, the peripheral region BR may not be provided herein. Unlike the active region AR, the peripheral region BR may not display image, sense external touch or sense external light, and may be an inactive region.

Figure 11A:
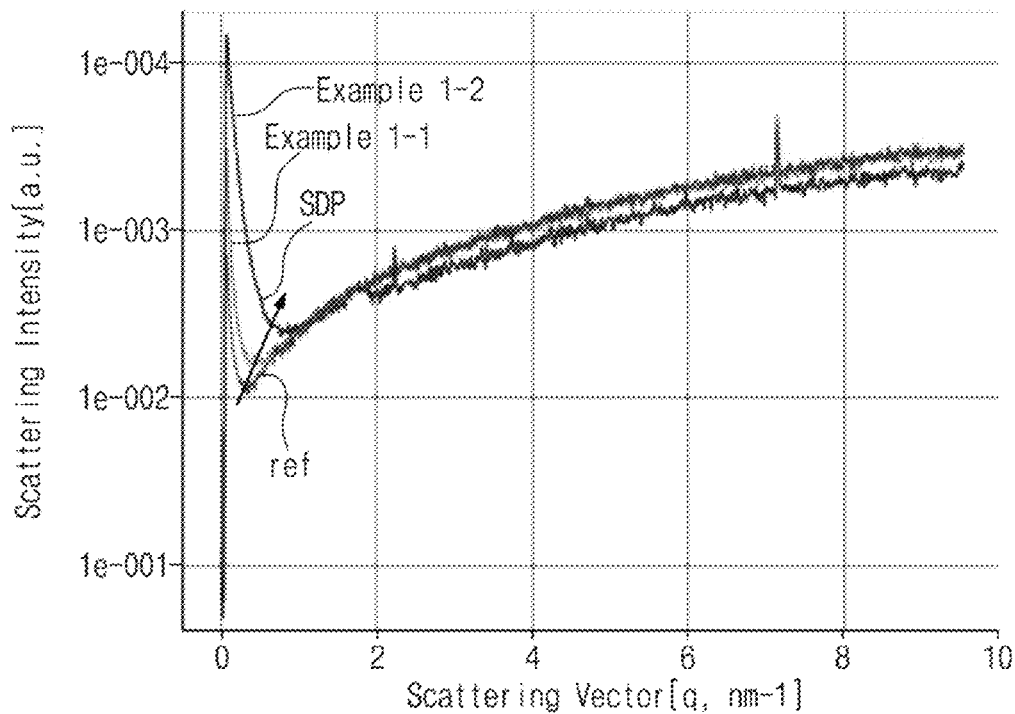
FIGS. 11A to 11C are graphs showing small angle X-ray scattering (SAXS) analysis results before and after a step of heat-treating a glass substrate in a method for manufacturing a glass substrate according to an exemplary embodiment of the present inventive concept.
Figure 11B:
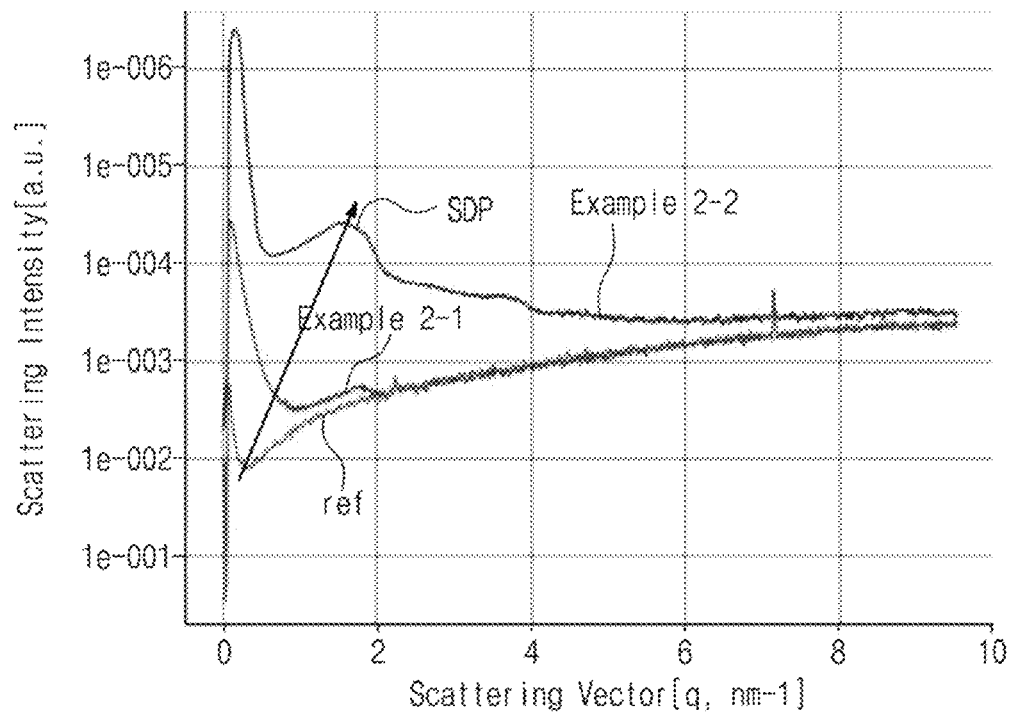

Referring to FIGS. 1A and 11B, the electronic device DS according to an exemplary embodiment of the present inventive concept may include a glass substrate CW, a display panel DP, and a housing HAU. The housing HAU, the display panel DP, and the glass substrate CW may be sequentially arranged in the third direction DR3.

In an exemplary embodiment of the present inventive concept, the glass substrate CW may be a window member or a cover window as one of the outer members of the electronic device DS. The glass substrate CW may be combined with the housing HAU to protect internal components from the outside environment. For example, the glass substrate CW and the housing HAU may protect the display panel DP. In this exemplary embodiment, the glass substrate CW serving as the cover window may define a front surface of the electronic device DS. The glass substrate CW may stably protect the internal components of the electronic device DS from the external impact.

The glass substrate CW may be divided into a first region CW-AR and a second region CW-BR on the plane defined by the first direction DR1 and the second direction DR2.

The first region CW-AR may be an optically transparent region. For example, the glass substrate CW in the first region CW-AR may have a high transmittance in the wavelength region of visible light. The first region CW-AR transmits the images IM1 and IM2 generated by the display panel DP, thereby allowing the images IM1 and IM2 to be easily visible to the user existing outside the glass substrate CW. The active region AR may be defined substantially by the first region CW-AR.

The second region CW-BR is adjacent to the first region CW-AR, and may be in the peripheral region BR of the electronic device DS. Since the peripheral region BR may not display image, the second region CW-BR may have a relatively lower optical transmittance than the first region CW-AR. The shape of the first region CW-AR may be defined by the second region CW-BR. However, this is exemplarily illustrated, and in the electronic device DS according to an exemplary embodiment of the present inventive concept, the second region CW-BR may not be provided herein.

The glass substrate CW may be divided into a flat portion FA and a bending portion BA. The flat portion FA may be a portion parallel to the plane defined by the first direction DR1 and the second direction DR2. The bending portion BA is adjacent to the flat portion FA, and may be a curved portion having a curved shape. For example, referring to FIG. 1B, the bending portion BA is a portion adjacent to both sides of the flat portion FA, and may be a portion bent downward from the flat portion FA. However, the present inventive concept is not limited thereto, and the bending portion BA may be disposed adjacent to only one side of the flat portion FA, or adjacent to all four sides of the flat portion FA on a plane. In an exemplary embodiment of the present inventive concept, the glass substrate CW may include a flat portion FA and at least one bending portion BA adjacent to the flat portion FA. The bending portion BA of the glass substrate CW may correspond to the bending region in the electronic device DS according to an exemplary embodiment of the present inventive concept.

The glass substrate CW may include an upper surface US (FIG. 4A) and a lower surface BS (FIG. 4A), which are spaced apart from each other in the third direction DR3 on the plane defined by the first direction DR1 and the second direction DR2. The upper surface US (FIG. 4A) and the lower surface BS (FIG. 4A) may be parallel to each other.

The upper surface US (FIG. 4A) may define the front surface of the electronic device DS, and may be a surface exposed to the user who uses the electronic device DS. The lower surface BS (FIG. 4A) may be a surface facing the display panel DP. In the combined perspective view of the electronic device DS illustrated in FIG. 1A, the lower surface BS (FIG. 4A) is not exposed to the outside.

The display panel DP may be disposed between the glass substrate CW and the housing HAU. The glass substrate CW may be attached to the display panel DP or may be mounted adjacent to the display panel DP without any attachments to the display panel DP. The display panel DP generates images IM1 and IM2, and may provide information to the user through the images IM1 and IM2. For example, the images IM1 and IM2 generated by the display panel DP may be transmitted through the lower surface BS then the upper surface US of the glass substrate CW to the user.

The display panel DP may include a base layer BSL and an element layer DD. The base layer BSL may include an insulation material. For example, the base layer BSL may be a base substrate including a glass, a plastic base substrate including a polymer material, or a laminated film including an organic film and/or an inorganic film. However, this is merely an example, and the base layer BSL according to an exemplary embodiment of the present inventive concept may include various configurations and is not limited to the above example.

The element layer DD may include electrical elements which are activated in response to electrical signals to display visual information to the user. In this exemplary embodiment, the element layer DD may include display elements for generating images IM1 and IM2. For example, the element layer DD may include an organic light emitting device, an electrowetting element, a liquid crystal capacitor, or an electrophoretic element. However, this is merely an example, and the element layer DD may include sensor elements such as touch sensors or optical sensors. The element layer DD according to an exemplary embodiment of the present inventive concept may include various elements depending on the functions of the electronic device DS, and is not limited to the above example.

The housing HAU may be one of the outer members of the electronic device DS. The housing HAU may be combined with the glass substrate CW to protect internal components from the outside environment. In this exemplary embodiment, the housing HAU may define the rear surface of the electronic device DS. In an exemplary embodiment of the present inventive concept, the housing HAU may be combined with the glass substrate CW to form a case or an enclosure, and may be formed of a material or materials such as, for example, plastic, glass, ceramics, metal, composites, or a combination of these materials.

The electronic device DS may further include various additional configurations capable of being disposed in the housing HAU. For example, the electronic device DS may further include a configuration for supplying electrical power to the display panel DP, a configuration for stably combining the glass substrate CW with the display panel DP, a configuration for stably combining the display panel DP with the housing HAU, and the like. For example, in an exemplary embodiment of the present inventive concept, the housing HAU may include one or more housing members to accommodate these various additional configurations. The electronic device DS according to an exemplary embodiment of the present inventive concept may be provided in various forms including various configurations, and is not limited to the above examples.

Figure 2:
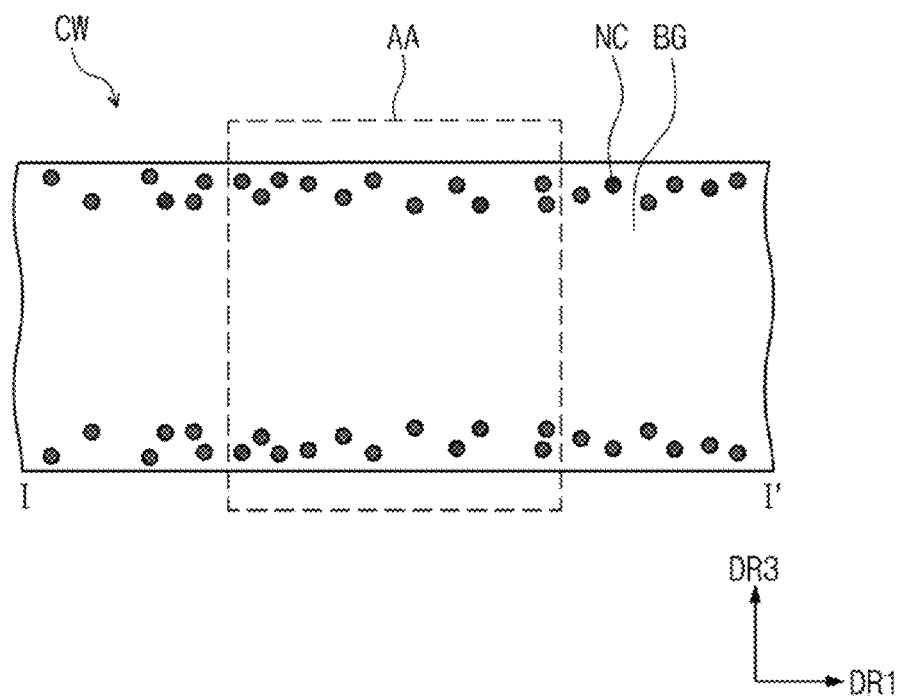
FIG. 2 is a cross-sectional view illustrating a part of a glass substrate according to an exemplary embodiment of the present inventive concept.
Figure 3:
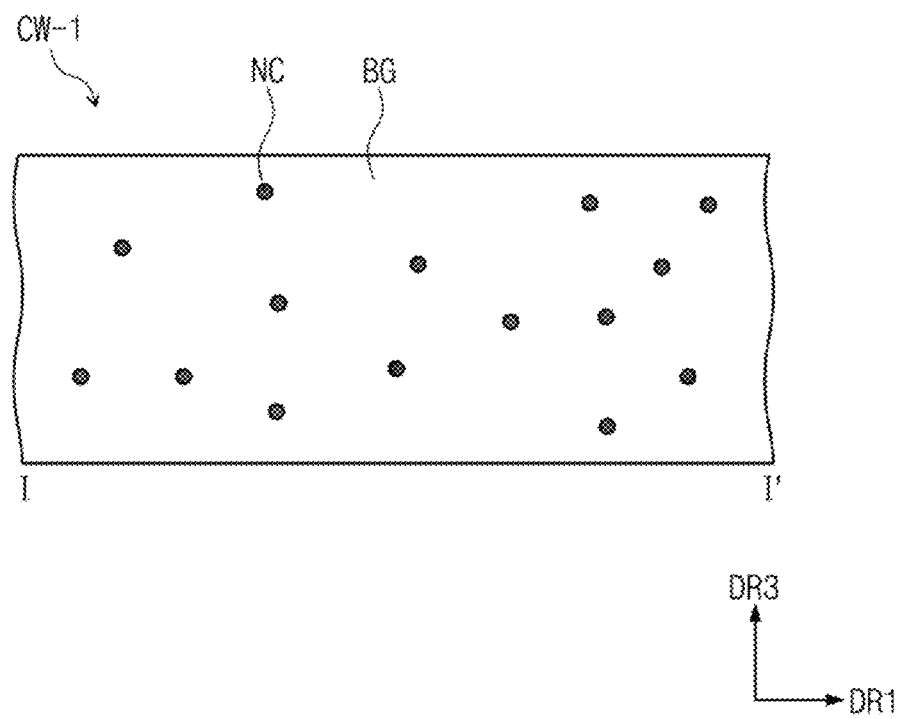
FIG. 3 is a cross-sectional view illustrating a part of a glass substrate according to an exemplary embodiment of the present inventive concept.
Figure 4A:
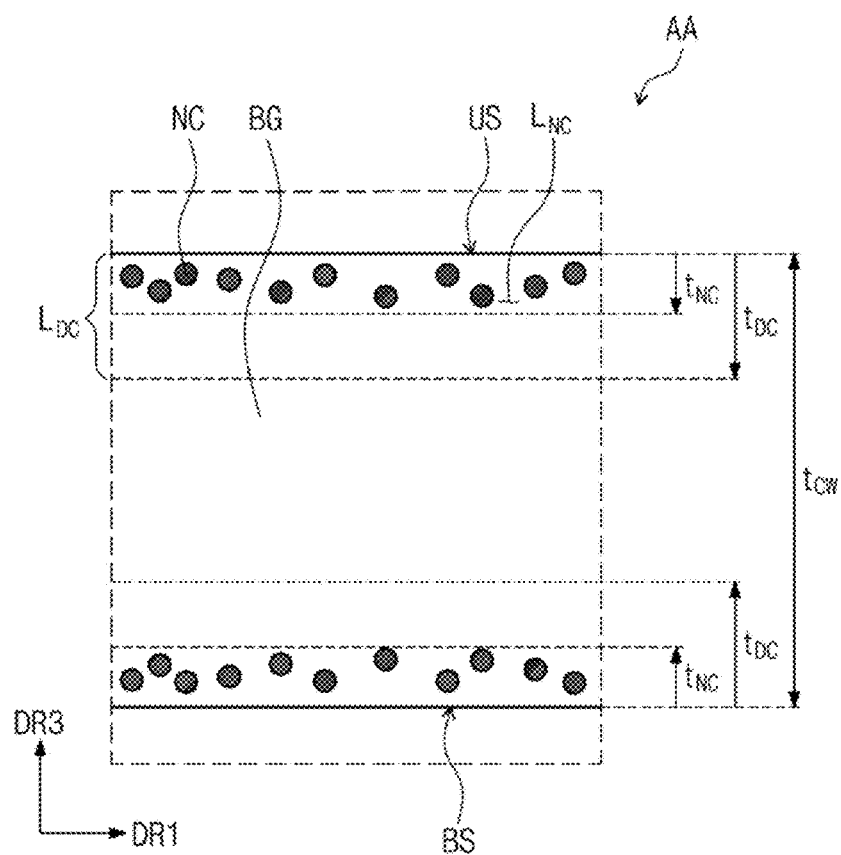
FIG. 4A is an enlarged view of region AA in FIG. 2.
Figure 4B:
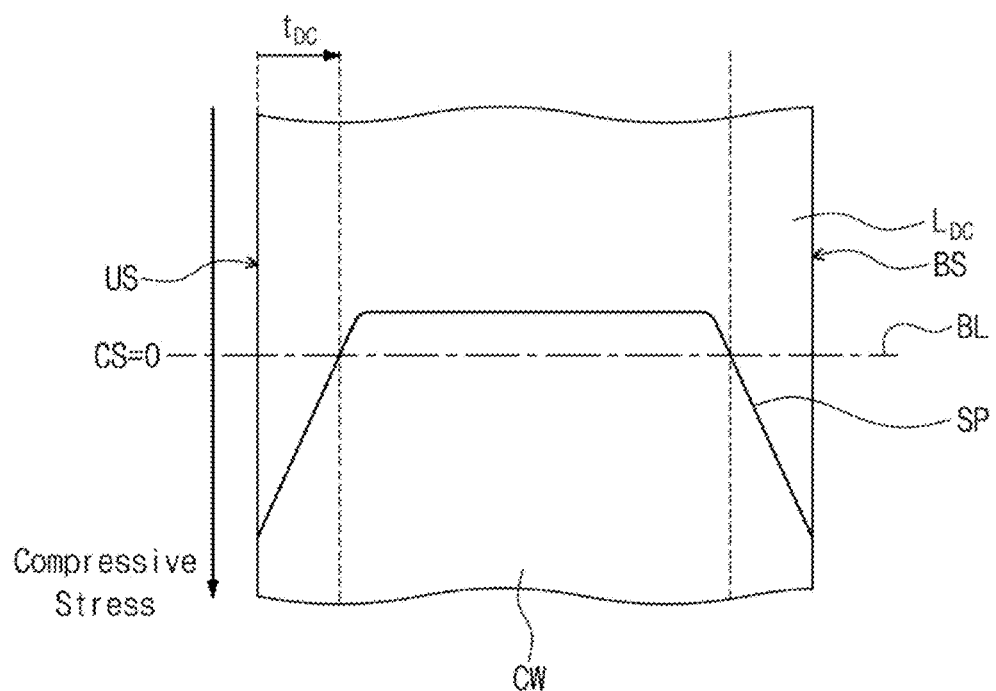
FIG. 4B is a view showing a compressive stress profile in the glass substrate according to an exemplary embodiment of the present inventive concept illustrated in FIG. 4A.

FIGS. 2 and 3 are cross-sectional views illustrating a glass substrate according to an exemplary embodiment of the present inventive concept, respectively. FIGS. 2 and 3 may be cross-sectional views illustrating a portion corresponding to line I-I' in FIG. 1B. FIG. 4A is an enlarged view of region AA in FIG. 2, and illustrates a cross-section of a glass substrate according to an exemplary embodiment of the present inventive concept. FIG. 4B is a compressive stress profile in a glass substrate according to an exemplary embodiment of the present inventive concept.

The glass substrate CW according to an exemplary embodiment of the present inventive concept may include a base glass BG and nanocrystals NC. The base glass BG may include silicon oxide ($SiO_2$), aluminum oxide ($Al_2O_3$), and lithium oxide ($Li_2O$), and the nanocrystals NC may have an average diameter in a range from about 5 nm to about 10 nm. The nanocrystals NC may be included in the base glass BG.

In this specification, the base glass BG may exhibit a preliminary glass substrate before performing a processing step. The processing step may include a toughening step, a heat-treating step, and the like. That is, the glass substrate CW according to an exemplary embodiment of the present inventive concept may exhibit a state provided after the heat-treating step, the toughening step, and the like are performed on the base glass BG. For example, the glass substrate CW in the electronic device DS (FIG. 1A) of the above-described exemplary embodiment is provided by processing the base glass BG, and may be used as a cover window.

The glass substrate CW according to an exemplary embodiment of the present inventive concept may include nanocrystals NC to exhibit enhanced strength properties. For example, the base glass BG including nanocrystals NC may serve as the glass substrate CW in the electronic device DS (FIG. 1A) of the above-described exemplary embodiment. The glass substrate CW according to an exemplary embodiment of the present inventive concept may include nanocrystals NC to suppress the occurrence of cracks by the external impact or the growth of cracks generated by the external impact, thereby having high impact resistance. The glass substrate CW according to an exemplary embodiment of the present inventive concept exhibits high surface strength and reduces the occurrence of cracks on the surface, thereby being capable of having high surface impact resistance.

The glass substrate CW according to an exemplary embodiment of the present inventive concept may have a high transmittance such that it is used as a cover window in the above-described electronic device DS (FIG. 1A), and the like. For example, the glass substrate CW may have a high transmittance of about 85% or more. Specifically, the glass substrate CW according to an exemplary embodiment of the present inventive concept may have a transmittance of about 85% or more in the wavelength region of visible light, and also have enhanced impact resistance. For example, the glass substrate CW may have a transmittance of about 85% or more in the wavelength region from about 350 nm to about 750 nm, but the present inventive concept is not limited thereto.

In an exemplary embodiment of the present inventive concept, the base glass BG may further include at least one of sodium oxide ($Na_2O$), potassium oxide ($K_2O$), magnesium oxide (MgO), barium oxide (BaO), strontium oxide (SrO), and calcium oxide (CaO) in addition to $SiO_2$, $Al_2O_3$, and $Li_2O$. Also, the base glass BG may further include Ferric oxide ($Fe_2O_3$), zinc oxide (ZnO), titanium oxide ($TiO_2$), phosphorus oxide ($P_2O_5$), zirconium oxide ($ZrO_2$) or the like.

The glass substrate CW includes nanocrystals NC, and the nanocrystals NC may have an average diameter in a range from about 5 nm to about 10 nm. The nanocrystals NC may be included in the base glass BG. The nanocrystals NC may have an unstereotyped three-dimensional shape, and the average diameter of the nanocrystals NC may be an arithmetic mean value for the maximum widths of the nanocrystals NC. The maximum width of each of the nanocrystals NC is determined by measuring the cross section of each of the plurality of the nanocrystals NC.

When the average diameter of the nanocrystals NC is smaller than 5 nm, the effect of enhancing the strength of the glass substrate CW including the nanocrystals NC may not be large. Further, when the average diameter of the nanocrystals NC is more than 10 nm, light incident on the glass substrate CW may be scattered by the nanocrystals NC distributed in the base glass BG, so that the transmittance of the glass substrate CW may be reduced.

The nanocrystals NC each may include lithium (Li). Besides Li, the nanocrystals NC may also include aluminum (Al) and/or silicon (Si). The nanocrystals NC included in the glass substrate CW according to an exemplary embodiment of the present inventive concept include Li, and may be Li—Si-based crystals or Li—Al—Si-based crystals. The Li—Si-based crystals may be crystals grown with precursors including Li and Si, and the Li—Al—Si-based crystals may be crystals grown with precursors including all of Li, Al, and Si.

The nanocrystals NC each may include lithium disilicate ($Li_2Si_2O_5$), lithium metasilicate ($Li_2SiO_3$) or the like as a Li—Si-based crystal. Further, the nanocrystals NC each may include lithium aluminosilicate, such as, for example, $LiAlSi_2O_6$, $LiAlSi_3O_3$ or the like, which is β-spodumene, as a Li—Al—Si-based crystal. Suitable lithium aluminosilicate may also include $LiAlSiO_4$, $LiAlSi_3O_8$, $LiAlSi_4O_{10}$ or the like. For example, the nanocrystals NC each may include at least one of $Li_2Si_2O_5$, $Li_2SiO_3$, $LiAlSi_2O_6$, and $LiAlSi_3O_3$.

Referring to FIG. 2, in the glass substrate CW according to an exemplary embodiment of the present inventive concept, the nanocrystals NC may be disposed adjacent to the surface of the glass substrate CW. On the other hand, unlike FIG. 2, in the glass substrate CW-1 according to an exemplary embodiment of the present inventive concept illustrated in FIG. 3, the nanocrystals NC may be dispersed and distributed in the base glass BG. For example, the nanocrystals NC may be homogeneously distributed in the entire base glass BG.

Referring to FIGS. 2 and 4A, the glass substrate CW may include an upper surface US and a lower surface BS opposite to each other, and may have a thickness $t_{CW}$ corresponding to a gap between the upper surface US and the lower surface BS. The thickness $t_{CW}$ of the glass substrate CW may be in a range from about 0.3 mm to about 0.8 mm. That is, the glass substrate CW according to an exemplary embodiment of the present inventive concept has a thin thickness in a range from about 0.3 mm to about 0.8 mm, thereby being used as the cover window of the electronic device DS (FIG. 1A) of the above-described embodiment, so that the electronic device DS (FIG. 1A) may be slimmed and light-weighted. For example, the glass substrate CW according to an exemplary embodiment of the present inventive concept can be thin (from about 0.3 mm to about 0.8 mm) yet having high surface strength to be suitable for use in electronic devices, such as portable electronic devices.

In the glass substrate CW according to an exemplary embodiment of the present inventive concept illustrated in FIGS. 2 and 4A, the nanocrystals NC may be disposed adjacent to the upper surface US and the lower surface BS of the base glass BG. That is, the nanocrystals NC may be disposed adjacent to the surface (e.g., the upper surface US) exposed to the outside in the glass substrate CW according to an exemplary embodiment of the present inventive concept.

In the glass substrate CW-1 according to an exemplary embodiment of the present inventive concept illustrated in FIG. 3, the nanocrystals NC may be dispersed and disposed inside the base glass BG, and may be randomly distributed in the base glass BG. The nanocrystals NC are particles each having a nanoscale size with an average diameter in a range from about 5 nm to about 10 nm. In an exemplary embodiment of the present inventive concept, the glass substrate CW-1 in which the nanocrystals NC are disposed in the base glass BG may maintain a high transmittance. For example, the glass substrate CW-1 may have a transmittance of about 85% or more in the wavelength region from about 350 nm to about 750 nm, but the present inventive concept is not limited thereto.

In the glass substrate CW according to an exemplary embodiment of the present inventive concept illustrated in FIGS. 2 and 4A, the nanocrystals NC may be mainly disposed adjacent to the surface of the glass substrate CW to exhibit more enhanced surface strength. In addition, the glass substrate CW-1 according to an exemplary embodiment of the present inventive concept illustrated in FIG. 3 may include the nanocrystals NC dispersed in the base glass BG to exhibit enhanced strength in a bulk state. In other words, the strength of the bulk or the surface of the glass substrate CW-1 or CW may be enhanced by the distribution of the nanocrystals NC in the bulk of the glass substrate CW-1 or adjacent to the surfaces of the glass substrate CW, respectively.

The glass substrate CW according to an exemplary embodiment of the present inventive concept may include a compressive stress layer $L_{DC}$. The compressive stress layer $L_{DC}$ may be formed adjacent to the surface of the glass substrate CW. The compressive stress layer $L_{DC}$ may be formed with a predetermined depth in a thickness direction from the surface of the glass substrate CW. In this specification, the compressive stress layer $L_{DC}$ may exhibit a region from the surface of the glass substrate CW to a point at which the compressive stress CS becomes zero. The glass substrate CW according to an exemplary embodiment of the present inventive concept may include the compressive stress layer $L_{DC}$ formed adjacent to at least one of the upper surface US and the lower surface BS of the base glass BG. Referring to FIGS. 4A and 4B, the glass substrate CW according to an exemplary embodiment of the present inventive concept may include a compressive stress layer $L_{DC}$: formed adjacent to each of the upper surface US and the lower surface BS of the base glass BG.

In the compressive stress layer $L_{DC}$, the compressive stress CS may be gradually decreased toward the thickness direction from the surface of the glass substrate CW. For example, the compressive stress layer $L_{DC}$ may be formed through a step of toughening a base glass in a method for manufacturing a glass substrate according to an exemplary embodiment of the present inventive concept to be described later.

The depth of the compressive stress layer $L_{DC}$ may be expressed as a depth of compression $t_{DC}$. The depth of compression $t_{DC}$ being formed can vary with the characteristics of the base glass BG used and the specific chemical treatment and process condition at the step of toughening the base glass BG. The glass substrate CW according to an exemplary embodiment of the present inventive concept may include crystal layers $L_{NC}$ disposed adjacent to the upper surface US and the lower surface BS of the base glass BG. The crystal layers $L_{NC}$ may exhibit regions in which the nanocrystals NC are disposed. In the glass substrate CW according to an exemplary embodiment of the present inventive concept, the crystal layers $L_{NC}$ may be formed adjacent to at least one of the upper surface US and the lower surface BS. Referring to FIGS. 2 and 4A, the glass substrate CW according to an exemplary embodiment of the present inventive concept may include a crystal layer $L_{NC}$ adjacent to each of the upper surface US and the lower surface BS.

In this specification, the crystal layer depth $t_{NC}$ may exhibit a maximum depth from the surface of the glass substrate CW to a point at which the nanocrystals NC are disposed when the nanocrystals NC are disposed adjacent to the upper surface US and the lower surface BS of the base glass BG. For example, the nanocrystals NC are distributed within a region from the upper surface US to the crystal layer depth $t_{NC}$ in the base glass BG and a region from the lower surface 13S to the crystal layer depth $t_{NC}$ in the base glass BG.

The compressive depth $t_{DC}$, which is the depth of the compressive stress layer $L_{DC}$ in the glass substrate CW according to an exemplary embodiment of the present inventive concept, may be a crystal layer depth $t_{NC}$ or more. The crystal layer depth $t_{NC}$ may be about 10% or less of the total glass substrate CW thickness $t_{CW}$. The crystal layers $L_{NC}$ are disposed adjacent to both the upper surface US and the lower surface BS of the base glass BG, and the crystal layer depth $t_{NC}$ of each crystal layer $L_{NC}$ may be about 10% or less of the total thickness of the glass substrate CW. Therefore, when the crystal layers $L_{NC}$ are disposed adjacent to both the upper surface US and the lower surface BS of the base glass BG, the total depth of the crystal layers $L_{NC}$ may be about 20% or less of the total glass substrate CW thickness $t_{CW}$.

In the glass substrate CW according to an exemplary embodiment of the present inventive concept, the nanocrystals NC may be included in the compressive stress layer $L_{DC}$. For example, the crystal layer $L_{NC}$ may be included in the compressive stress layer $L_{DC}$. For example, the crystal layer depth $t_{NC}$ may be equal to or smaller than the compressive depth too.

FIG. 4B is an exemplary illustration of a stress profile SP showing the distribution of compressive stress CS in the glass substrate CW according to an exemplary embodiment of the present inventive concept. In FIG. 4B, the arrow direction of the axis indicating the compressive stress CS corresponds to a direction in which the compressive stress CS is increased. Referring to FIG. 4B, the glass substrate CW according to an exemplary embodiment of the present inventive concept may exhibit a maximum compressive stress CS value on the upper surface US and the lower surface BS of the base glass BG, respectively, and a gradually decreased compressive stress CS value toward the central direction of the glass substrate CW. On the other hand, at the compressive depth $t_{DC}$ or more, the compressive stress CS value may exhibit a negative value (−). The negative compressive stress CS value may be a tensile stress. For example, the glass substrate CW according to an exemplary embodiment of the present inventive concept may have first and second compressive stress surface portions opposite each other bound to a tensile stress core portion. The compressive depth $t_{DC}$ may exhibit a vertical distance from the upper surface US or the lower surface BS to a point at which the compressive profile SP intersects with a reference line BL in which the compressive stress CS becomes zero.

The glass substrate CW according to an exemplary embodiment of the present inventive concept may have a compressive stress CS of about 600 MPa or more from the surface. For example, the glass substrate CW may have a compressive stress CS of about 800 MPa or more from the surface. The compressive depth $t_{DC}$ may be about 10% or more of the total thickness $t_{CW}$ of the glass substrate CW. For example, the compressive depth $t_{DC}$ may be about 15% or more of the total thickness $t_{CW}$ from the surface of the glass substrate CW. On the other hand, the crystal layer depth $t_{NC}$ may be about 10% or less of the total glass substrate CW thickness $t_{CW}$.

The glass substrate CW according to an exemplary embodiment of the present inventive concept may include a base glass BG including $SiO_2$, $Al_2O_3$, and $Li_2O$, and nanocrystals NC having an average diameter in a range from about 5 nm to about 10 nm, thereby having enhanced impact resistance. On the other hand, in an exemplary embodiment of the present inventive concept, the nanocrystals NC are included in the base glass BG. In addition, in an exemplary embodiment of the present inventive concept, the glass substrate CW which includes a compressive stress layer $L_{DC}$ with nanocrystals NC included in the compressive stress layer $L_{DC}$ and having an average diameter in a range from about 5 nm to about 10 nm may exhibit enhanced surface strength.

The glass substrate CW of the above-described embodiment may include nanocrystals NC each including Li, thereby having enhanced impact resistance while maintaining a high transmittance. For example, the glass substrate CW may have a transmittance of about 85% or more in the wavelength region from about 350 nm to about 750 nm, but the present inventive concept is not limited thereto. Meanwhile, the glass substrate CW according to an exemplary embodiment of the present inventive concept may include the nanocrystals NC disposed in a region adjacent to the surface of the glass substrate CW so as to be included in the compressive stress layer $L_{DC}$, thereby exhibiting enhanced strength properties while exhibiting good transmittance properties. For example, the glass substrate CW may have a transmittance of about 85% or more in the wavelength region from about 350 nm to about 750 nm, but the present inventive concept is not limited thereto.

Hereinafter, a method for manufacturing the above-described glass substrate according to an exemplary embodiment of the present inventive concept will be described with reference to FIGS. 5 to 15B. In the description of the method for manufacturing the glass substrate according to an exemplary embodiment of the present inventive concept, the contents overlapping those of the glass substrate of the above-described exemplary embodiment will not be described again, but the differences will be mainly described.

Figure 5:
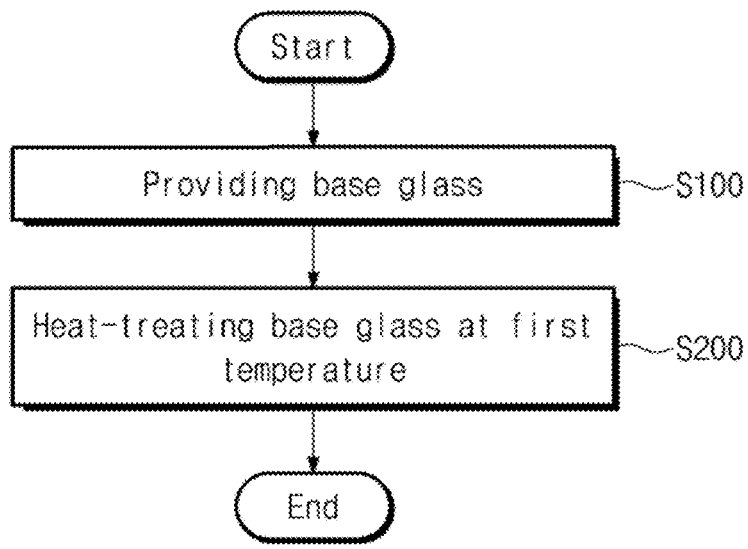
FIG. 5 is a flowchart showing a method for manufacturing a glass substrate according to an exemplary embodiment of the present inventive concept.
Figure 6:
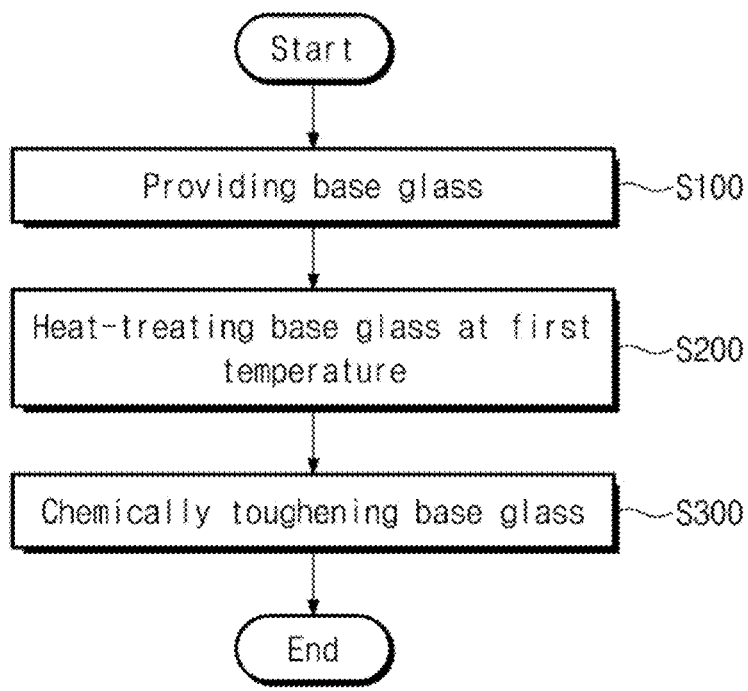
FIG. 6 is a flowchart showing a method for manufacturing a glass substrate according to an exemplary embodiment of the present inventive concept.

FIGS. 5 and 6 are flowcharts showing methods for manufacturing a glass substrate according to an exemplary embodiment of the present inventive concept, respectively. Referring to FIGS. 5 and 6, a method for manufacturing a glass substrate according to an exemplary embodiment of the present inventive concept may include step S100 of providing a base glass, and step S200 of heat-treating the base glass at a first temperature. In addition, a method for manufacturing a glass substrate according to an exemplary embodiment of the present inventive concept may further include a step of toughening the base glass. In the method for manufacturing a glass substrate according to an exemplary embodiment of the present inventive concept, the step of toughening the base glass may be step S300 of chemically toughening the base glass.

In the step S100 of providing the base glass, the base glass may include $SiO_2$, $Al_2O_3$, and $Li_2O$. The base glass provided may be flat. Also, the base glass may be bent. For example, the base glass may be bent convexly or concavely on the basis of the central portion. In other words, the base glass may include a flat portion and a bending portion at an outer portion adjacent to the flat portion. In an exemplary embodiment of the present inventive concept, the base glass may include a flat portion and at least one bending portion adjacent to the flat portion. However, the present inventive concept is not limited thereto, and the base glass may be provided in various shapes.

The base glass provided may be manufactured by a float process, a down draw process, a fusion process, or the like. Alternatively, the thin base glass may be formed by grinding or etching from a thicker glass. However, the present inventive concept is not limited thereto, and the base glass provided may be manufactured by various methods not exemplified. The base glass provided in the step S100 of providing the base glass may be an unprocessed glass substrate manufactured by any of the various processes described above, or a glass substrate cut from the mother glass substrate in consideration of the intended use.

In an exemplary embodiment of the present inventive concept, the base glass provided may further include at least one of $Na_2O$, $K_2O$, MgO, BaO, SrO and CaO in addition to $SiO_2$, $Al_2O_3$, and $Li_2O$. Also, the base glass may further include $Fe_2O_3$, ZnO, $TiO_2$, $ZrO_2$, $P_2O_5$, or the like.

The method for manufacturing a glass substrate according to an exemplary embodiment of the present inventive concept may further include step S200 of heat-treating the base glass at a first temperature after the step S100 of providing the base glass. In the method for manufacturing a glass substrate according to an exemplary embodiment of the present inventive concept, the step S200 of heat-treating the base glass at the first temperature may be a step of growing nanocrystals inside the base glass provided. For example, the step S200 of heat-treating the base glass at the first temperature may be a step of forming the nanocrystals grown from $Li_2O$ included in the base glass provided. In an exemplary embodiment of the present inventive concept, the heat-treating of the base glass at the first temperature may include two or more steps with two or more different temperatures in the heat-treating process. By heat-treating the base glass with two or more heating stages may grow the nanocrystals better or may grow the nanocrystals to form the desired shape and having the desired composition, and thus may provide the base glass to have better strength properties while exhibiting good transmittance properties.

The first temperature may be in a range from $(Tg+50)°$ C. to $(Ts+150)°$ C. Here, the Tg is the glass transition temperature of the base glass, and the Ts is the softening point temperature of the base glass. When the first temperature of heat-treating the base glass is lower than $(Tg+50)°$ C., the base glass is not deformed, but the mobility of the ions distributed therein is lowered, so that nucleation for nanocrystal growth may be difficult. Also, when the first temperature exceeds $(Ts+150)°$ C., nucleation and nanocrystal growth may be easily performed, but the base glass may be deformed by the influence of high temperature.

Figure 7:
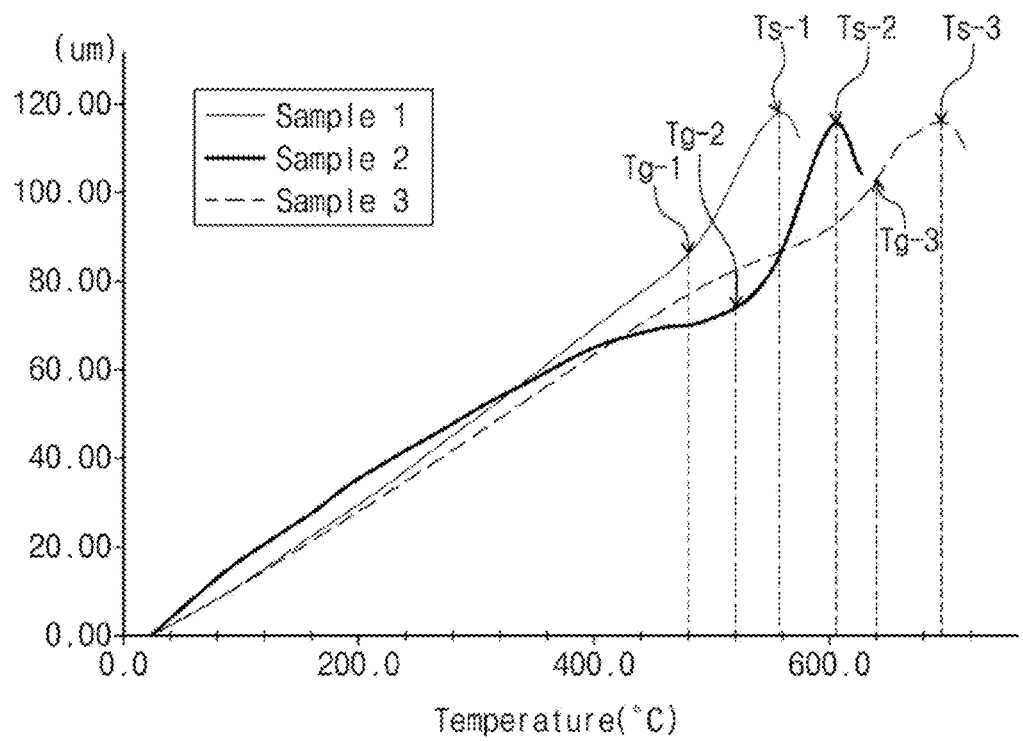
FIG. 7 is a graph showing thermal analysis results of a glass substrate provided by a method for manufacturing a glass substrate according to an exemplary embodiment of the present inventive concept.

FIG. 7 is a graph showing thermal analysis results of the base glass. FIG. 7 shows thermal analysis results performed for three base glass samples using thermomechanical analysis (TMA). The base glasses indicated as Samples 1 to 3 all include $SiO_2$, $Al_2O_3$, and $Li_2O$. In FIG. 7, Tg (Tg-1, Tg-2, Tg-3) is the glass transition temperature for each sample, and Ts (Ts-1, Ts-2, Ts-3) is the softening point temperature for each sample. Referring to FIG. 7, Tg of the base glass provided in the method for manufacturing a glass substrate according to an exemplary embodiment of the present inventive concept may be in a range from about 400° C. to about 700° C., and Ts thereof may be in a range from about 500° C. to about 750° C.

Based on the TMA results above, the first temperature for heat-treating the base glass may be in a range from about 450° C. to about 900° C. For example, the first temperature may be in a range from (Tg+50)° C. (e.g., Tg is about 400° C.) to (Ts+150)° C. (e.g., Ts is about 750° C.). That is, when the first temperature is lower than about 450° C., the mobility of the ions of the base glass therein is lowered, so that nanocrystal growth may not be easy, and when the first temperature exceeds about 900° C., the base glass may be deformed.

The step S200 of heat-treating at the first temperature may be carried out in a gas-phase chamber. The base glass may be provided into the chamber in various forms. For example, the base glass is processed in the form of cells, so that the plurality of cells may be provided in an overlapping state. On the other hand, the processed cell may be cut and molded into the form of a glass substrate CW (FIG. 1A), and used as a cover window of the above-described electronic device DS (FIG. 1A). When the plurality of cells are provided in an overlapping form and the step of heat-treating is performed in the chamber, the overlapping cells act as a support, thereby being capable of minimizing the deformation of the base glass even under high temperature processing conditions.

The step S200 of heat-treating at the first temperature may be performed by a method in which the base glass provided in the form of an unprocessed glass is suspended and fixed in the vertical direction in the chamber, and is heat-treated.

Figure 8:
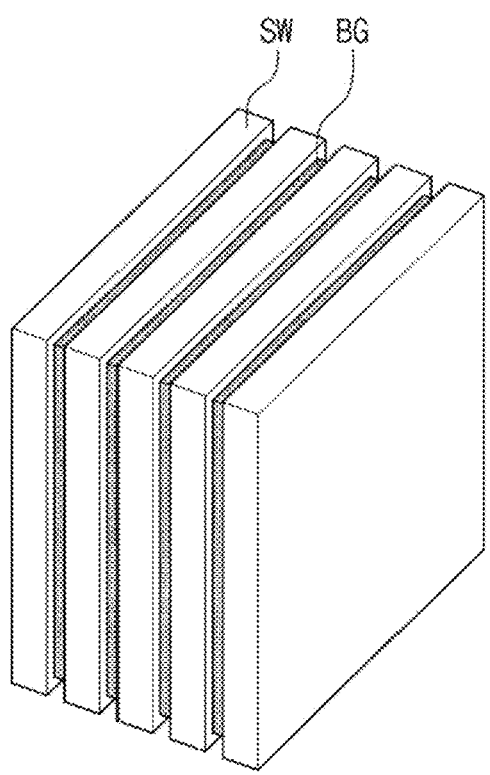
FIG. 8 is a view illustrating a part of a method for manufacturing a glass substrate according to an exemplary embodiment of the present inventive concept.

The step S200 of heat-treating the base glass in the form of an unprocessed glass at the first temperature may be performed using a heat-resistant glass. FIG. 8 is a view showing the step of heat-treating the base glass at the first temperature according to an exemplary embodiment of the present inventive concept.

In FIG. 8, the base glasses BG may be provided in a laminated state together with heat-resistant glasses SW. The heat-resistant glass SW may be a glass substrate having a thickness larger than that of the base glass BG which is a glass substrate before processing, and may have heat resistance such that thermal deformation does not occur at the softening point Ts temperature or higher of the base glass BG. The heat-resistant glasses SW may be larger in size in comparison to the base glass BG. The base glass BG and the heat-resistant glass SW are disposed in an alternate manner, and the base glass BG is disposed between the heat-resistant glasses SW facing each other, thereby being supported by the heat-resistant glasses SW during the step of heat-treating, so that the deformation of the base glass BG may be minimized.

The step S200 of heat-treating the base glass at the first temperature may be performed for about 24 hours or more at the first temperature. For example, the step S200 of heat-treating at the first temperature may be performed for about 24 hours to about 96 hours. For example, the step S200 of heat-treating at the first temperature may be performed for about 48 hours to about 72 hours.

In the step S200 of heat-treating the base glass at the first temperature, the nanocrystals may be formed. That is, the base glass may be heat-treated for about 24 hours or more at the first temperature to grow the nanocrystals such that they are adjacent to the inside of the base glass or the surface of the base glass. In an exemplary embodiment of the present inventive concept, depending on the specific composition of the base glass, and by means of TMA and x-ray diffraction analysis, suitable conditions (e.g. heating temperature and heating time) in heat-treating the base glass may be selected and performed on the base glass to grow the nanocrystals having the desired morphology, composition and size in the base glass.

The nanocrystals may be crystal particles each including Li. The nanocrystals may be formed by $Li_2O$ included in the base glass and serving as a nucleating agent. Alternatively, micro defects, dust, or the like on the surface of the base glass may become nuclei for nanocrystal growth, so that the nanocrystals may be grown and disposed adjacent to the surface of the base glass.

The nanocrystals generated in the step S200 of heat-treating at the first temperature may be Li—Si-based crystals, or Li—Al—Si-based crystals. The nanocrystals each may include at least one of $Li_2Si_2O_5$, $Li_2SiO_3$, $LiAlSi_2O_6$, and $LiAlSi_3O_3$. Alternatively, the nanocrystals may include or additionally include at least one of $LiAlSiO_4$, $LiAlSi_3O_8$, and $LiAlSi_{40}$. The nanocrystals may have an average diameter in a range form about 5 nm to about 10 nm.

Unlike the method for manufacturing the glass substrate of the above-described exemplary embodiment, the base glass provided in the step S100 of providing the base glass may be provided such that ceramic powder is included. For example, FIG. 9 shows step S100 of providing a base glass according to an exemplary embodiment of the present inventive concept.

Figure 9:
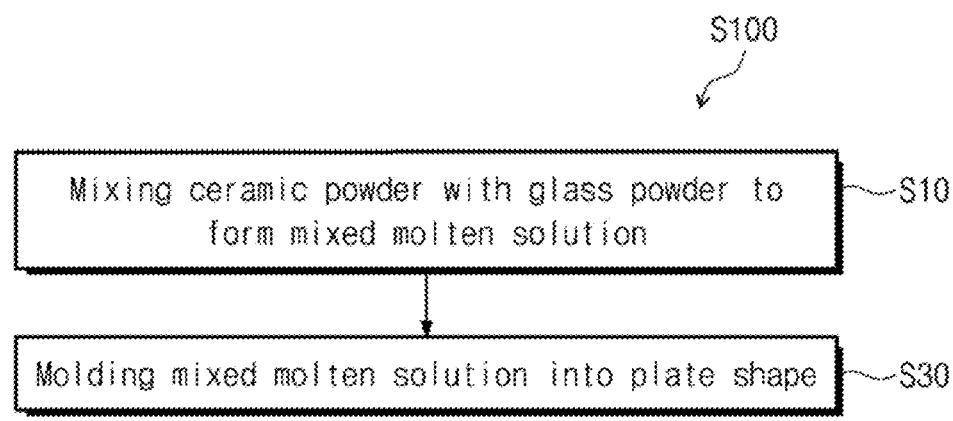
FIG. 9 is a block diagram showing a part of a method for manufacturing a glass substrate according to an exemplary embodiment of the present inventive concept.

Referring to FIG. 9, the step S100 of providing the base glass may include step S10 of mixing ceramic powder and glass powder to form a mixed molten solution, and step S30 of molding the mixed molten solution into a plate shape. Meanwhile, the ceramic powder may be nanocrystals each including Li. That is, unlike the base glass provided in the method for manufacturing a glass substrate of the exemplary embodiment described with reference to FIGS. 5 and 6, the base glass manufactured and provided like the exemplary embodiment shown in FIG. 9 may include crystal particles inside the base glass before the step S200 (FIG. 5) of heat-treating the base glass.

The ceramic powder may be Li—Si-based crystals, Li—Al—Si-based crystals, or an inorganic material such as $TiO_2$, $P_2O_5$, and $ZrO_2$. However, the present inventive concept is not limited thereto, and the ceramic powder may be used without limitation as long as it may be mixed with glass powder and serve as a nucleating agent capable of growing crystals.

The glass powder may be pulverized glass particles. The glass powder may be obtained by pulverizing an unprocessed glass manufactured by the float process, the down-draw process, the fusion process or the like as described above. The glass powder may include $SiO_2$, $Al_2O_3$, and $Li_2O$.

The ceramic powder and the glass powder may be molten at a softening point temperature Ts or higher of the glass powder to form a mixed molten solution. Next, the mixed molten solution may be provided in a jig for molding and molded into a plate shape to manufacture a base glass. The step S200 (FIG. 5) of heat-treating may be performed on the base glass formed by molding.

The step S200 (FIG. 5) of heat-treating the base glass at the first temperature may be a step of heat-treating the base glass provide by the exemplary embodiment shown in FIG. 9 and growing crystals inside the base glass. The glass substrate manufactured by heat-treating the base glass provided by the exemplary embodiment shown in FIG. 9 may be in the form in which the nanocrystals NC are dispersed inside the base glass BG, like the glass substrate CW-1 of the exemplary embodiment illustrated in FIG. 3 as described above. The nanocrystals formed as illustrated in FIG. 9 each may include at least one of $Li_2Si_2O_5$, $Li_2SiO_3$, $LiAlSi_2O_6$, and LiAlSi$_3$O$_3$. Alternatively, the nanocrystals may include or additionally include at least one of LiAlSiO$_4$, LiAlSi$_3$O$_8$, and LiAlSi$_4$O$_{10}$.

The method for manufacturing a glass substrate according to an exemplary embodiment of the present inventive concept may further include a step of toughening a base glass after the step S200 of heat-treating the base glass at the first temperature. Referring to FIG. 6, the method for manufacturing a glass substrate according to an exemplary embodiment of the present inventive concept may include step S300 of chemically toughening the base glass heat-treated after the step S200 of heat-treating the base glass at the first temperature.

The step S300 of chemically toughening the base glass may be a step of providing a toughening molten salt to the base glass to enhance the surface strength of the base glass by using ion exchange. The base glass heat-treated at the first temperature includes nanocrystals therein, and the surface thereof may be strengthened by ion exchange. For example, the step S300 may further enhance the surface strength of the base glass after heat-treated at the first temperature. For example, the step S300 of chemically toughening the base glass by ion exchange may be performed by exchanging alkali metal ions having a relatively small ionic radius on the surface of the base glass with alkali metal ions having a larger ionic radius. For example, the surface toughening may be achieved by exchanging Na$^+$ ions or the like on the surface of the base glass with K$^+$ ions or the like. The glass substrate manufactured through the step S300 of chemically toughening may include a compressive stress layer L$_{DC}$ (FIGS. 4A and 4B) on the surface thereof. On the other hand, the compressive stress value may exhibit a negative value (−) in the center of the base glass after the step S300 of chemically toughening. The negative compressive stress value may be a tensile stress. For example, the glass substrate manufactured through the step S300 of chemically toughening may have first and second compressive stress surface portions opposite each other bound to a tensile stress core portion.

The step S300 of chemically toughening the base glass may include a single salt including any one ion of Na$^+$, K$^+$, Rb$^+$ and Cs$^+$ as a toughening molten salt. Alternatively, the step S300 of chemically toughening the base glass may include a mixed salt including two or more ions of Li$^+$, Na$^+$, K$^+$, Rb$^+$ and Cs$^+$ as a toughening molten salt. For example, the mixed salt may include two ions of Li$^+$, Na$^+$, K$^+$, Rb$^+$ and Cs$^+$.

The step S300 of chemically toughening the base glass may be performed as one toughening step. Alternatively, the step S300 of chemically toughening the base glass may be divided into a plurality of sub-steps and performed. For example, the step S300 of chemically toughening the base glass may be carried out in a multistage toughening step.

When the step S300 of chemically toughening the base glass is performed in the multistage toughening step, the composition of the toughening molten salt used in each toughening sub-step may be different. However, the present inventive concept is not limited thereto, and the composition of the toughening molten salt used in each toughening sub-step may be the same as each other, or the composition of some molten salt may be different.

The step S300 of chemically toughening the base glass may be performed at a second temperature. The second temperature may be a temperature equal to or lower than the first temperature of the step S200 of heat-treating the base glass. For example, the second temperature may be in a range from about 350° C. to about 500° C. For example, the second temperature may be in a range from about 350° C. to about 450° C.

When the step S300 of chemically toughening the base glass is performed in the multistage toughening step, a first toughening sub-step of performing ion-exchange treatment at a first toughening temperature and a second toughening sub-step of performing ion exchange treatment at a second toughening temperature may be included. For example, the step S300 of chemically toughening the base glass may include the first toughening sub-step and the second toughening sub-step, and the second temperature performed at the step 300 may include the first toughening temperature and the second toughening temperature. Meanwhile, when the step S300 of chemically toughening is performed in the multistage toughening step, the second toughening temperature may be equal to or lower than the first toughening temperature. In an exemplary embodiment of the present inventive concept, the first toughening temperature and the second toughening temperature may be in a range from about 350° C. to about 500° C.

A compressive stress layer may be formed adjacent to the surface of the base glass after the step S300 of chemically toughening the base glass. The compressive stress layer L$_{DC}$ (FIGS. 4A and 4B) may be defined as a layer from the upper surface US or the lower surface BS of the glass substrate to a point at which the compressive stress CS value becomes zero. The depth t$_{DC}$ of the compressive stress layer L$_{DC}$ (FIGS. 4A and 4B) may be defined as a depth of compression (DOC).

The depth from the upper surface US or the lower surface BS of the glass substrate to a point at which the concentration of Na$^+$ ions becomes zero may be similar to the depth of compression (DOC), which is the depth of the compressive stress layer L$_{DC}$ (FIGS. 4A and 4B). For example, the depth from the upper surface US or the lower surface BS of the glass substrate to the point where the concentration of Na$^+$ ions becomes zero may be in the range of the depth of compression (DOC)±10 μm. In other words, the depth of compression (DOC) is the thickness of the glass surface layer where the ion exchange occurs and the compressive stress produces.

The compressive stress layer L$_{DC}$ (FIGS. 4A and 4B) may include a sub-compressive stress layer defined as a point at which the concentration of K$^+$ ions become zero. The sub-compressive stress layer may be a layer formed by K$^+$ ion exchange. The depth of the sub-compressive stress layer may be defined as a depth of K$^+$ ion layer (DOL-K).

When the step S300 of chemically toughening the base glass is performed in the multistage toughening step, the compressive stress layer L$_{DC}$ (FIGS. 4A and 4B) may include a transition point at which the profile of the compressive stress is transitioned. In this case, the transition point of the compressive stress value may be a point corresponding to the depth of K ion layer (DOL-K), which is a point at which the concentration of K$^+$ ions become zero. When the step S300 of chemically toughening the base glass is performed in the multistage toughening step, the compressive stress layer may exhibit both the depth of compression (DOC) and the depth of K$^+$ ion layer (DOL-K). The depth of K$^+$ ion layer (DOL-K) may be included in the depth of compression (DOC). For example, the depth of K$^+$ ion layer (DOL-K) may be smaller than the depth of compression (DOC).

Figure 10:
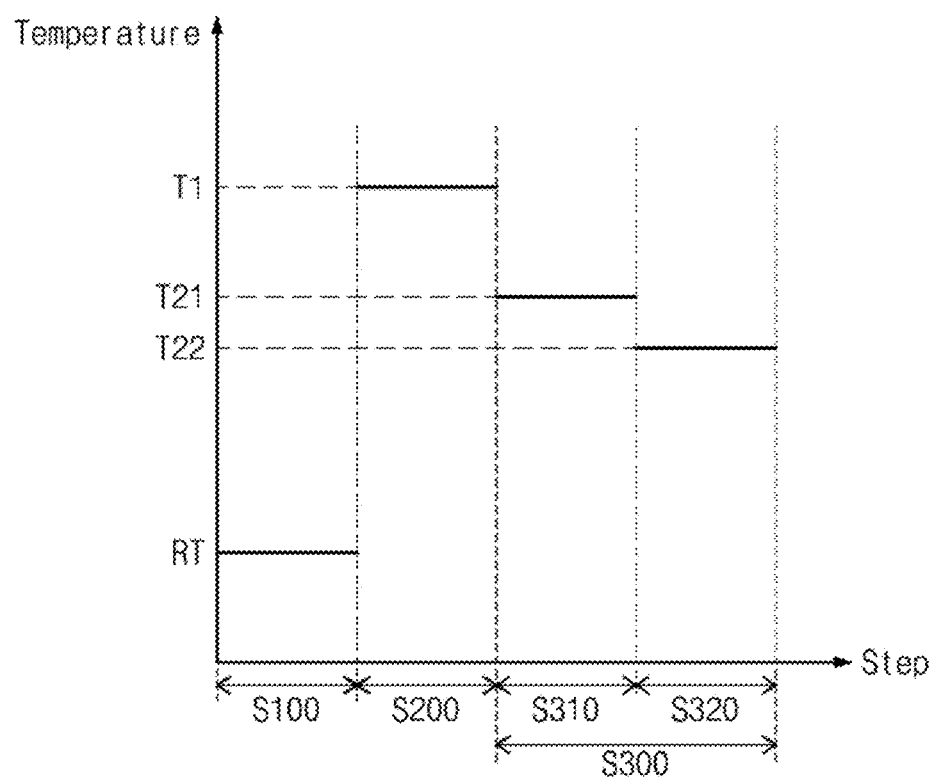
FIG. 10 is a profile showing changes in process temperature in a method for manufacturing a glass substrate according to an exemplary embodiment of the present inventive concept.

FIG. 10 schematically shows a temperature profile in a process according to the steps of the method for manufacturing a glass substrate according to an exemplary embodiment of the present inventive concept. Meanwhile, the temperature profile in the process shown in FIG. 10 may indicate the temperature of the base glass or the glass substrate in each process step.

Referring to FIG. 10, the base glass in the step S100 of providing the base glass may be provided at room temperature RT. The base glass provided may include $SiO_2$, $Al_2O_3$, and $Li_2O$.

Thereafter, the step S200 of heat-treating the base glass at the first temperature may be performed at a temperature T1. That is, the temperature of the base glass may be maintained at T1 during the step S200 of heat-treating. In this case, the temperature T1 may be a temperature in a range from $(Tg+50)°$ C. to $(Ts+150)°$ C. of the base glass. For example, T1 may be in a range from about 450° C. to 900° C. (for example about 700° C.). Here, only one heat-treating temperature T1 is exemplified, but the present inventive concept is not limited thereto. For example, in an exemplary embodiment of the present inventive concept, the base glass may be subjected to a first heat treatment at a first temperature to form nuclei in the base glass suitable for forming nanocrystals, then the base glass may be subjected to a second heat treatment at a second temperature to form the nanocrystals having the desired morphology, composition and size in the base glass.

FIG. 10 shows a temperature profile in the case where the step S300 of chemically toughening the base glass is performed in the multistage toughening step. The step S300 of chemically toughening the base glass may include a first toughening sub-step S310 of performing ion-exchange treatment at T21, which is the first toughening temperature, and a second toughening sub-step S320 of performing ion-exchange treatment at T22, which is the second toughening temperature. T21 and T22, which are the first and second toughening temperatures of the step S300 of chemically toughening the base glass, may be a temperature equal to or lower than T1, which is the first temperature. Also, T22, which is the second toughening temperature, may be equal to or lower than T21, which is the first toughening temperature. In an exemplary embodiment of the present inventive concept, the first toughening temperature T21 and the second toughening temperature T22 may be in a range from about 350° C. to about 500° C.

Figure 11C:
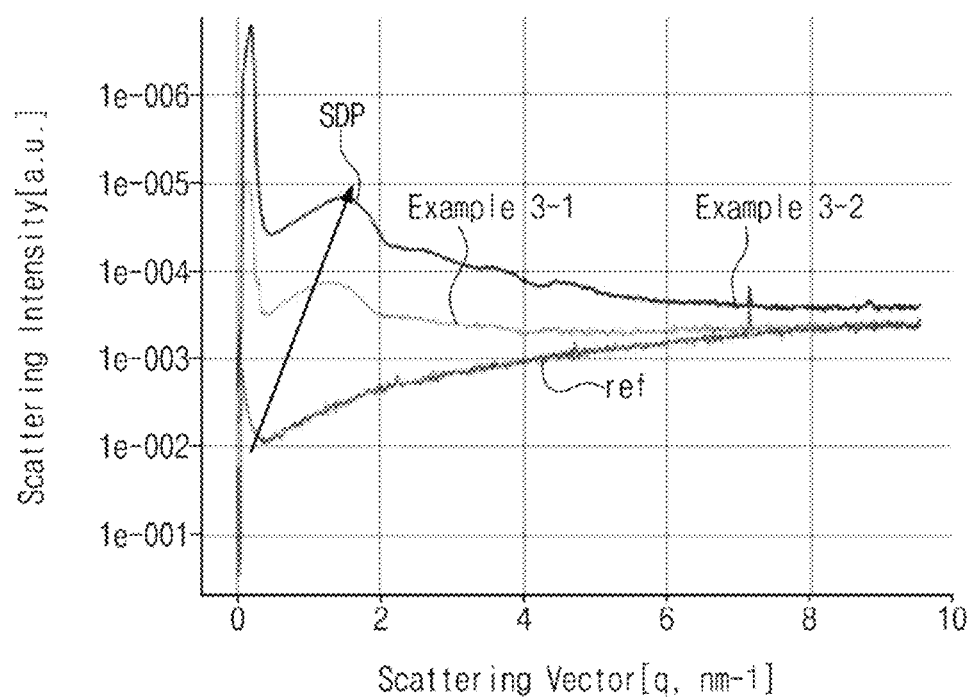

FIGS. 11A to 11C are graphs showing small angle X-ray scattering (SAXS) analysis results before and after the step of heat-treating in the method for manufacturing a glass substrate according to an exemplary embodiment of the present inventive concept. FIGS. 11A to 11C indicate SAXS data for Examples 1 to 3, respectively, wherein "ref" is SAXS data for the base glass before the step of heat-treating, and Examples indicate SAXS data after the step of heat-treating the base glass. In FIGS. 11A to 11C, "SDP" indicates a shoulder peak, and it can be seen from the increase of the area of the shoulder peak whether or not the nanocrystals are grown. Meanwhile, in FIGS. 11A to 11C, the arrow (→) indicates the increasing direction of the shoulder peak.

In FIG. 11A, "ref" is a SAXS analysis graph for the base glass before the step of heat-treating, "Example 1-1" is a SAXS analysis graph after the step of heat-treating the base glass of "ref" for about 72 hours at about 535° C., and "Example 1-2" is a SAXS analysis graph after the step of heat-treating the base glass of "ref" for about 48 hours at about 575° C. From the result of FIG. 11A, it can be seen that the nanocrystals after the step of heat-treating were grown in the glass substrate, from the fact that the shoulder peak SDP after the step of heat-treating was larger than the shoulder peak SDP before the step of heat-treating.

In FIG. 11B, "Example 2-1" is a SAXS analysis graph after the step of heat-treating the base glass of "ref" for about 48 hours at about 650° C., and "Example 2-2" indicates a SAXS analysis graph after the step of heat-treating the base glass of "ref" for about 72 hours at about 620° C. The temperatures used in heat-treating the base glass in FIG. 11B were larger than the temperatures used in heat-treating the base glass in FIG. 11A, and the shoulder peaks SDP after the step of heat-treating the base glass in FIG. 118 were larger than the shoulder peaks SDP after the step of heat-treating the base glass in FIG. 11A. Also, in FIG. 11C, "Example 3-1" is a SAXS analysis graph after the step of heat-treating the base glass of "ref" for about 48 hours at about 700° C., and "Example 3-2" indicates a SAXS analysis graph after the step of heat-treating the base glass of "ref" for about 72 hours at about 665° C. For the same heating time (i.e., 48 hours or 72 hours) in the two heating temperatures in FIGS. 11B and 11C, the temperature used in heat-treating the base glass in FIG. 11C was larger than the temperature used in heat-treating the base glass in FIG. 11B, and the shoulder peak SDP after the step of heat-treating the base glass in FIG. 11C was larger than the shoulder peak SDP after the step of heat-treating the base glass in FIG. 11B.

Referring to FIGS. 11B and 11C, it can be seen that the nanocrystals were grown after the step of heat-treating, from the fact that the shoulder peak SDP after the step of heat-treating became larger than the shoulder peak PDF before the step of heat-treating. Therefore, From the SAXS analysis result of FIGS. 11A to 11C, it can be seen that the method for manufacturing a glass substrate according to an exemplary embodiment of the present inventive concept may form the nanocrystals by heat-treating the base glass at the first temperature.

Figure 12:
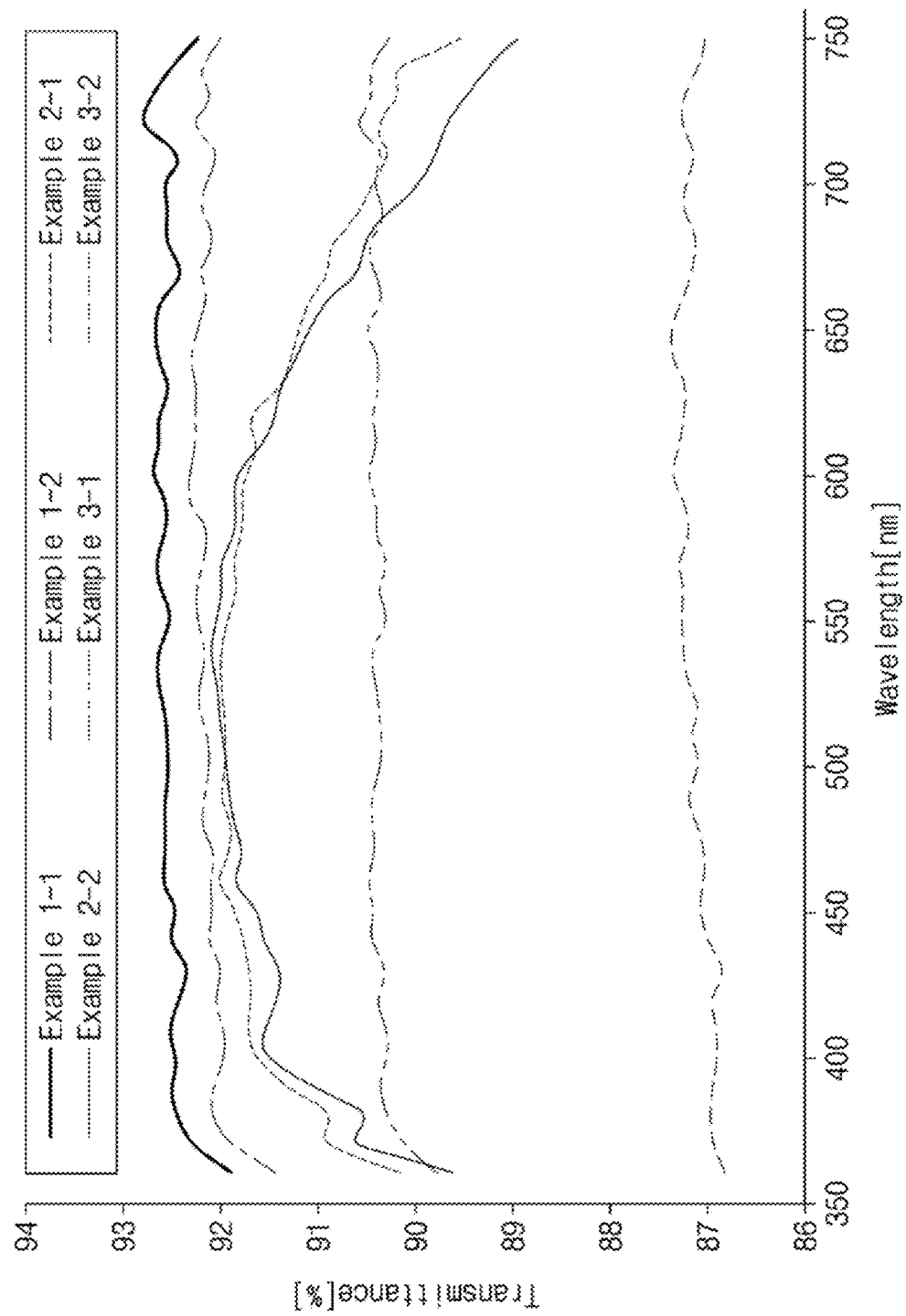
FIG. 12 is a graph showing transmittance evaluation results of a glass substrate manufactured by a method for manufacturing a glass substrate according to an exemplary embodiment of the present inventive concept.

FIG. 12 is a graph showing a transmittance of the glass substrate manufactured in the method for manufacturing a glass substrate according to an exemplary embodiment of the present inventive concept. In FIG. 12, the transmittance was measured in a wavelength range from 350 nm to 750 nm, and in all Examples, a high transmittance of about 85% or more was exhibited. Meanwhile, Examples 1-1 to 3-2 were manufactured under the same condition as Examples used in the evaluation of SAXS shown in FIGS. 11A to 11C. Therefore, from the transmittance measurement result of FIG. 12, it can be seen that the method for manufacturing a glass substrate according to an exemplary embodiment of the present inventive concept maintains good transmittance properties even after the nanocrystals are grown by heat-treating the base glass at the first temperature. Example 3-2 exhibits a shoulder peak SDP (referring to FIG. 11C) higher than those of Examples 1-1 to 3-1 (referring to FIGS. 11A to 11C) indicating higher growth of the nanocrystals in Example 3-2 than the other Examples, and thus exhibits a transmittance in the visible light range lower than those of Examples 1-1 to 3-1 (referring to FIG. 12) due to more light scattering by the nanocrystals in Example 3-2.

Figure 13A:
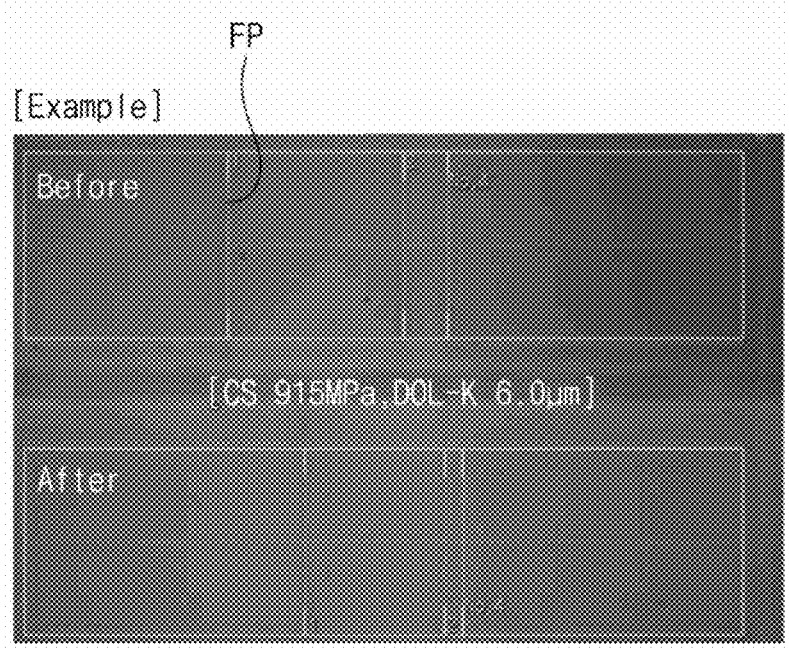
FIG. 13A is an image showing fringe patterns before and after a step of toughening a glass substrate manufactured by a method for manufacturing a glass substrate according to an exemplary embodiment of the present inventive concept.
Figure 13B:
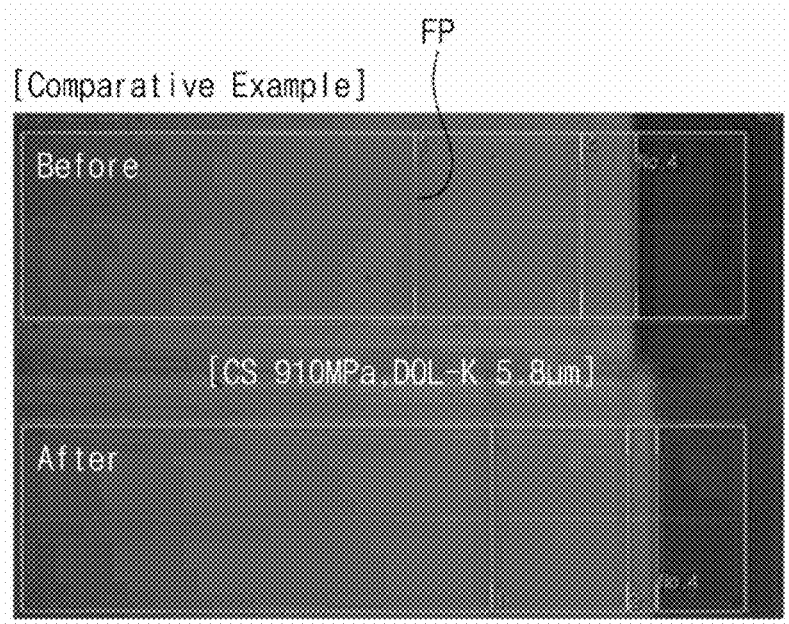
FIG. 13B is an image showing fringe patterns before and after a step of toughening a glass substrate manufactured by a method for manufacturing the glass substrate of Comparative Example.

FIGS. 13A and 13B are images showing fringe patterns before and after the step of toughening the base glass in the method for manufacturing a glass substrate according to an exemplary embodiment of the present inventive concept. Also, FIGS. 14A and 14B are images showing a profile of compressive stress after the step of toughening the base glass in the glass substrate manufactured by the method for manufacturing a glass substrate.

FIG. 13A is a graph comparing changes in the fringe pattern before and after the step of toughening the base glass in Example manufactured by the method for manufacturing a glass substrate according to an exemplary embodiment of the present inventive concept. FIG. 13B is a graph comparing changes in the fringe pattern before and after the step of toughening the base glass in Comparative Example, which is a glass substrate manufactured without performing the step of heat-treating the base glass at the first temperature unlike the method for manufacturing a glass substrate according to an exemplary embodiment of the present inventive concept. In addition, FIG. 14A shows a stress profile SP after the step of toughening the base glass in Example manufactured by the method for manufacturing a glass substrate according to an exemplary embodiment of the present inventive concept, and FIG. 14B shows a stress profile SP' after the step of toughening the base glass in Comparative Example, which is a glass substrate manufactured without performing the step of heat-treating the base glass at the first temperature unlike the method for manufacturing a glass substrate according to an exemplary embodiment of the present inventive concept.

Referring to FIGS. 13A and 13B, it can be seen that changes in the fringe pattern before and after the step of toughening the base glass and after the step of toughening the base glass are similar in Example and Comparative Example. That is, it can be seen that even when the nanocrystals are formed by heat-treating the base glass before the step of toughening the base glass like the method for manufacturing a glass substrate according to an exemplary embodiment of the present inventive concept, toughening properties are similar to the case of Comparative Example which does not perform the step of heat-treating the base glass. That is, it can be seen from FIGS. 13A and 13B that in Example and Comparative Example, the compressive stress CS values are similar at the depth of K$^+$ ion layer (DOL-K), which is the depth of sub-compressive stress layer after the step of toughening. As shown in FIGS. 13A and 13B, the depths of K$^+$ ion layer (DOL-K) in Example and Comparative Example are similar.

Figure 14A:
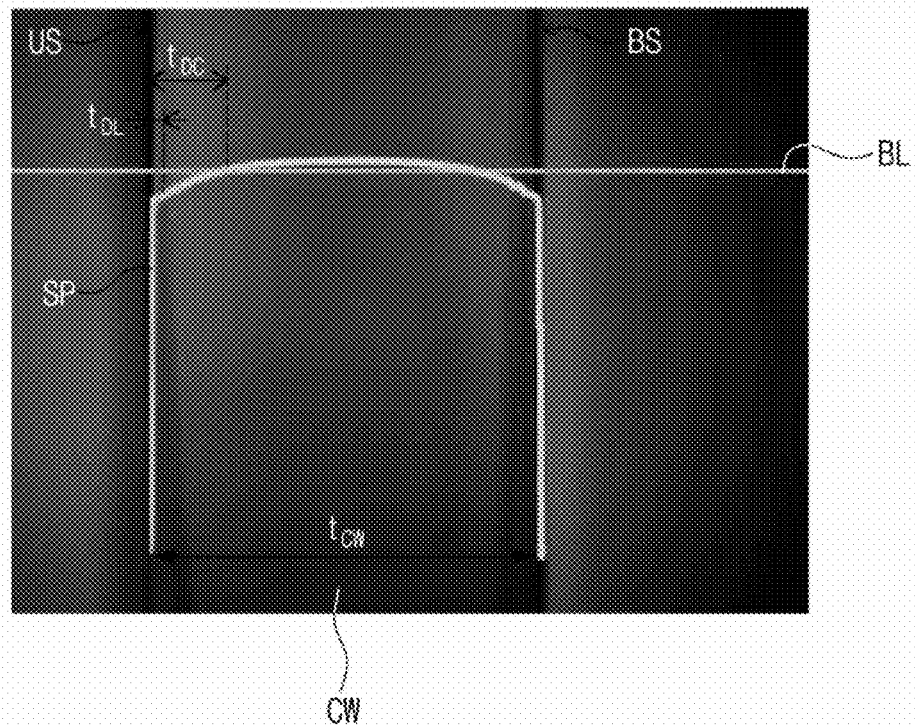
FIG. 14A is an image showing a stress profile of compressive stress in a glass substrate manufactured by a method for manufacturing a glass substrate according to an exemplary embodiment of the present inventive concept.
Figure 14B:
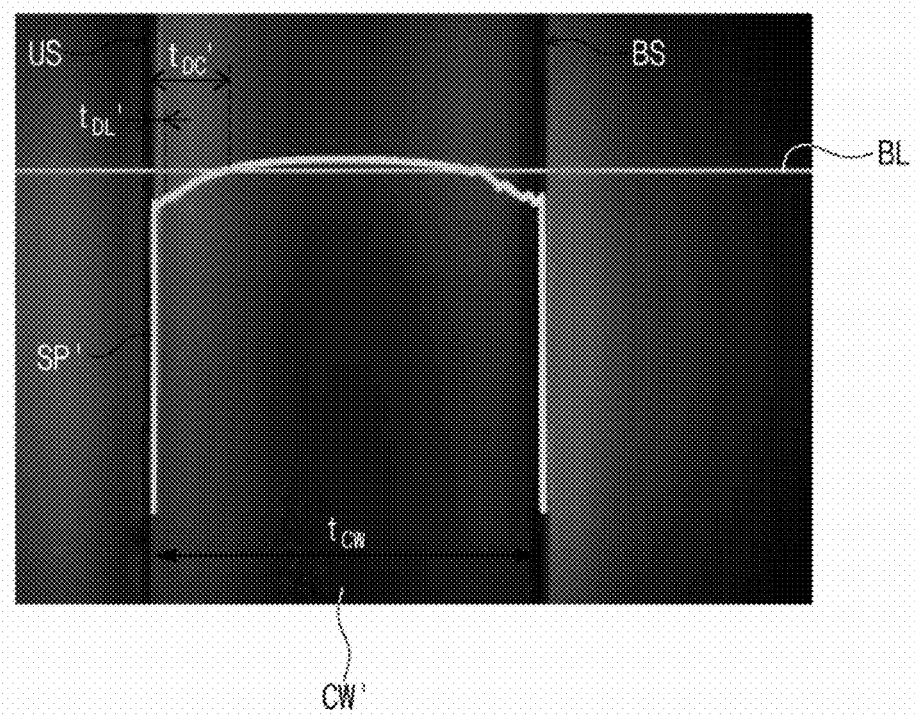
FIG. 14B is an image showing a stress profile of compressive stress in a glass substrate manufactured by a method for manufacturing the glass substrate of Comparative Example.

Referring to FIGS. 14A and 14B, it can be seen that in Example and Comparative Example, the shapes of stress profiles SP and SP' after the step of toughening are similar. Also, it can be seen from the images of FIGS. 14A and 14B that in Example and Comparative Example, the depths of compressive stress layers are similar. Further, it can be seen from the images of FIGS. 14A and 14B that in Example and Comparative Example, the depths of compressive stress layers are similar.

In FIG. 14A, $t_{CW}$ is a total thickness of the glass substrate CW. Also, $t_{DC}$ indicates a depth of compression (DOC), that is, a vertical depth from the upper surface US or the lower surface BS of the glass substrate to a point at which the stress profile SP intersects with the reference line BL where the compressive stress value becomes zero. For example, the compressive stress value becomes a negative value (−) in the center of the glass substrate CW. The negative compressive stress value may be a tensile stress. For example, the glass substrate CW of Example may have first and second compressive stress surface portions opposite each other bound to a tensile stress core portion. Also, $t_{DL}$ indicates a depth of K$^+$ ion layer (DOL-K), that is, a depth from the upper surface US or the lower surface BS of the glass substrate CW to a point at which the concentration of K$^+$ ions becomes zero. In FIG. 14B, $t_{CW'}$ is a total thickness of the glass substrate CW' in Comparative Example. Also, $t_{DC}'$ indicates a depth of compression (DOC), that is, a vertical depth from the upper surface US or the lower surface BS of the glass substrate CW' to a point at which the stress profile SP' intersects with the reference line BL where the compressive stress value becomes zero. For example, the compressive stress value becomes a negative value (−) in the center of the glass substrate CW'. The negative compressive stress value may be a tensile stress. For example, the glass substrate CW' of Comparative Example may have first and second compressive stress surface portions opposite each other bound to a tensile stress core portion. Also, $t_{DL}'$ indicates a depth of K$^+$ ion layer (DOL-K) in Comparative Example, that is, a depth from the upper surface US or the lower surface BS of the glass substrate CW' in Comparative Example to a point at which the concentration of K$^+$ ions becomes zero.

It can be seen from FIGS. 14A and 14B that even when the nanocrystals are formed by heat-treating the base glass before the step of toughening the base glass like the method for manufacturing a glass substrate according to an exemplary embodiment of the present inventive concept, toughening properties are similar to the case of Comparative Example without performing the step of heat-treating.

Figure 15A:
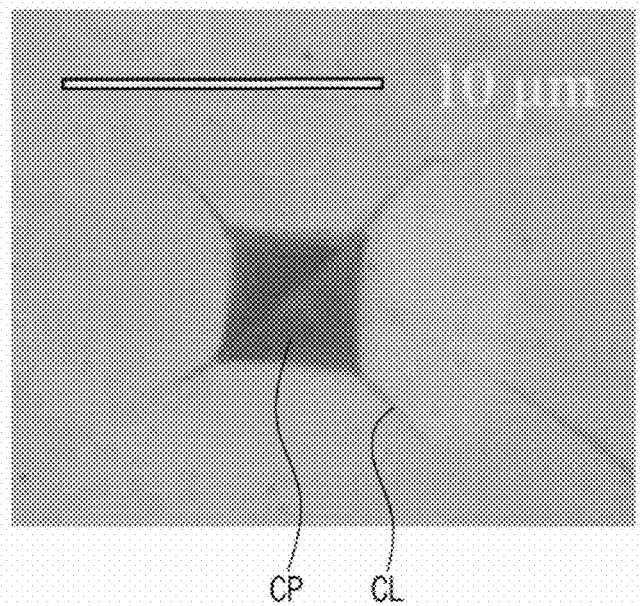
FIG. 15A is an image showing an impact test result in a glass substrate manufactured by a method for manufacturing a glass substrate according to an exemplary embodiment of the present inventive concept.

FIG. 15A is an image showing an impact test result in a glass substrate manufactured by the method for manufacturing a glass substrate according to an exemplary embodiment of the present inventive concept. In addition, FIG. 15B is an image showing an impact test result in a glass substrate manufactured by the method for manufacturing a glass substrate of Comparative Example.

Figure 15B:
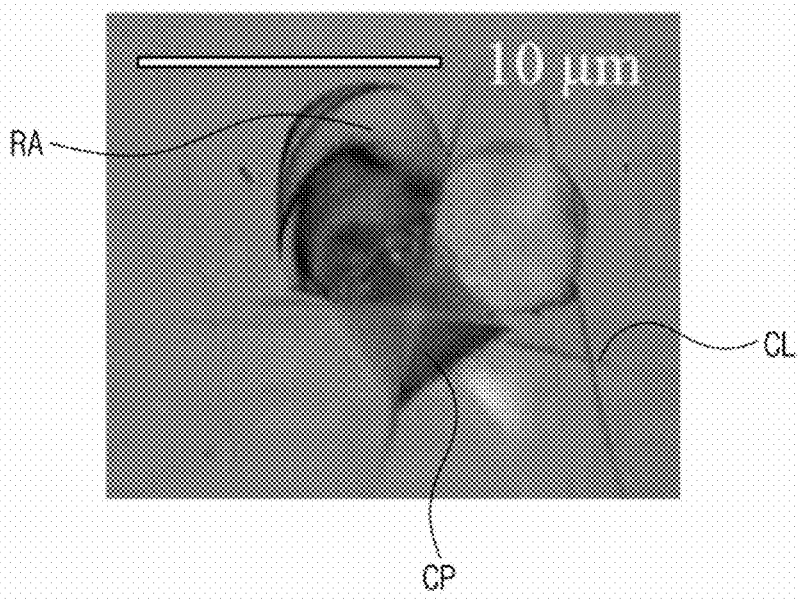
FIG. 15B is an image showing an impact test result in a glass substrate manufactured by a method for manufacturing the glass substrate of Comparative Example.

FIGS. 15A and 15B show images of a glass substrate surface after applying impact to the glass substrate surface. FIG. 15A shows a state after a crack CP is formed by applying impact to the glass substrate surface of Example manufactured by the method for manufacturing a glass substrate according to an exemplary embodiment of the present inventive concept. FIG. 15B shows a state after the crack CP is formed by applying impact to the glass substrate surface of Comparative Example, which is a glass substrate manufactured without performing the step of heat-treating the base glass at the first temperature, unlike the method for manufacturing a glass substrate according to an exemplary embodiment of the present inventive concept.

Referring to FIGS. 15A and 15B, it can be seen that a crack line CL on which the crack CP grows is more extended and expanded in Comparative Example as compared with Example. In addition, in the case of FIG. 15B showing the glass substrate image of Comparative Example, unlike FIG. 15A, it can be seen that a crack pattern RA of the surface appears. Therefore, referring to FIGS. 15A and 15B, it can be seen that the glass substrate of Example manufactured by the method for manufacturing a glass substrate according to an exemplary embodiment of the present inventive concept is manufactured through the step of heat-treating at the first temperature, thereby exhibiting enhanced surface strength properties. That is, the method for manufacturing a glass substrate according to an exemplary embodiment of the present inventive concept includes the step of heat-treating the base glass at the first temperature such that the glass substrate includes nanocrystals, so that enhanced surface strength properties may be exhibited.

The method for manufacturing a glass substrate according to an exemplary embodiment of the present inventive concept includes a step of heat-treating a base glass at a first temperature, so that the glass substrate may allow nanocrystals to be included, thereby providing a glass substrate having enhanced strength while exhibiting good transmittance properties. In addition, the method for manufacturing a glass substrate according to an exemplary embodiment of the present inventive concept may perform the step of heat-treating the base glass at the first temperature before the step of toughening the base glass, thereby providing a glass substrate having enhanced surface strength while maintaining the strength properties of the glass substrate.

An exemplary embodiment of the present inventive concept may provide a glass substrate including nano-sized crystals to enhance surface strength while maintaining a high transmittance. For example, the nanocrystals may have an average diameter in a range from about 5 nm to about 10 nm.

An exemplary embodiment of the present inventive concept may provide a method for manufacturing a glass substrate including a step of heat-treating before a step of toughening to grow up nano-sized crystals in a glass substrate, thereby enhancing the strength of the glass substrate. For example, the nanocrystals may have an average diameter in a range from about 5 nm to about 10 nm.

While the present inventive concept has been particularly shown and described with reference to exemplary embodiments thereof, it will be understood by those skilled in the art that various changes and modifications may be made without departing from the spirit and scope of the present inventive concept as defined by the appended claims.

What is claimed is:

1. A glass substrate comprising:
a base glass including $SiO_2$, $Al_2O_3$, and $Li_2O$; and
nanocrystals included in the base glass, and having an average diameter in a range from about 5 nm to about 10 nm,
wherein the nanocrystals are only disposed in a crystal layer adjacent to one or each of an upper surface and a lower surface of the base glass, and
a depth of the crystal layer from the one or each of the upper surface and the lower surface of the base glass is about 10% or less of total thickness of the base glass.

2. The glass substrate of claim 1, wherein each of the nanocrystals is a crystal particle including Li.

3. The glass substrate of claim 1, wherein the nanocrystals each comprises at least one of $Li_2Si_2O_5$, $Li_2SiO_3$, $LiAlSi_2O_6$, or $LiAlSi_3O_3$.

4. The glass substrate of claim 1, further comprising a compressive stress layer formed adjacent to a surface of the base glass.

5. The glass substrate of claim 4, wherein a depth of the compressive stress layer is not smaller than the depth of the crystal layer,
wherein the depth of the crystal layer is a maximum depth from the surface of the base glass to a point at which the nanocrystals are disposed.

6. The glass substrate of claim 4, wherein the nanocrystals are included in the compressive stress layer.

7. The glass substrate of claim 1, wherein the base glass comprises a flat portion and at least one bending portion adjacent to the flat portion.

8. The glass substrate of claim 1, having a transmittance of about 85% or more in wavelength region of visible light at a thickness in a range from about 0.3 mm to about 0.8 mm.

9. A glass substrate comprising:
a compressive stress layer formed adjacent to a surface thereof, and
nanocrystals distributed in the compressive stress layer and having an average diameter in a range from about 5 nm to about 10 nm,
wherein the compressive stress layer is formed with a compressive depth in a thickness direction from the surface of the glass substrate,
the nanocrystals are only distributed in a range within a crystal layer depth in the thickness direction from the surface of the glass substrate, and
the crystal layer depth is equal to or smaller than the compressive depth.

10. The glass substrate of claim 9, wherein the nanocrystals are disposed adjacent to an upper surface and a lower surface.

11. The glass substrate of claim 9, wherein the nanocrystals each comprises at least one of $Li_2Si_2O_5$, $Li_2SiO_3$, $LiAlSi_2O_6$, or $LiAlSi_3O_3$.

12. A method for manufacturing a glass substrate, the method comprising:
providing a base glass including $SiO_2$, $Al_2O_3$, and $Li_2O$; and
heat-treating the base glass at a first temperature,
wherein the first temperature is in a range from $(Tg+50)°C$ to $(Ts+150)°C$, wherein the Tg is a glass transition temperature of the base glass, and the Ts is a softening point temperature of the base glass, and
during the heat-treating of the base glass, heat-resistant glass substrates are disposed on both sides of the base glass to support the base glass.

13. The method of claim 12, wherein the heat-treating of the base glass is forming nanocrystals in the base glass each including Li, and the nanocrystals have an average diameter in a range from about 5 nm to about 10 nm.

14. The method of claim 13, wherein the nanocrystals are formed adjacent to at least one of an upper surface or a lower surface of the base glass.

15. The method of claim 12, further comprising toughening the base glass.

16. The method of claim 15, wherein the toughening of the base glass is performed by providing a toughening molten salt to the heat-treated base glass and chemically toughening the base glass at a second temperature.

17. The method of claim 16, wherein the second temperature is equal to or lower than the first temperature.

18. The method of claim 16, wherein the toughening molten salt is a single salt including any one ion of $Na^+$, $K^+$, $Rb^+$ and $Cs^+$, or a mixed salt including at least two ions of $Li^+$, $Na^+$, $K^+$, $Rb^+$ and $Cs^+$.

19. The method of claim 16, wherein the chemically toughening comprises:
a first toughening step of performing ion-exchange treatment at a first toughening temperature; and
a second toughening step of performing ion-exchange treatment at a second toughening temperature, which is equal to or lower than the first toughening temperature.

20. The method of claim 12, wherein the Tg is in a range from about 400° C. to about 700° C., and the Ts is in a range from about 500° C. to about 750° C.

21. The method of claim 12, wherein the providing of the base glass comprises:
mixing ceramic powder and glass powder to form a mixed molten solution; and
molding the mixed molten solution into a plate shape.

22. The method of claim 21, wherein the ceramic powder is nanocrystals each including Li.

* * * * *